US012621079B2

(12) United States Patent
Liu et al.

(10) Patent No.: US 12,621,079 B2
(45) Date of Patent: May 5, 2026

(54) CODING RATE ADJUSTMENT METHOD AND RELATED DEVICE

(71) Applicant: Huawei Technologies Co., Ltd., Shenzhen (CN)

(72) Inventors: Yan Liu, Shenzhen (CN); Jinzhou Ye, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 329 days.

(21) Appl. No.: 18/171,468

(22) Filed: Feb. 20, 2023

(65) Prior Publication Data

US 2023/0198659 A1 Jun. 22, 2023

Related U.S. Application Data

(63) Continuation of application No. PCT/CN2021/106044, filed on Jul. 13, 2021.

(30) Foreign Application Priority Data

Aug. 21, 2020 (CN) .......................... 202010848146.7

(51) Int. Cl.
| *H04L 1/00* | (2006.01) |
| *H04W 36/00* | (2009.01) |
| *H04W 36/30* | (2009.01) |

(52) U.S. Cl.
CPC ....... *H04L 1/0009* (2013.01); *H04W 36/0011* (2013.01); *H04W 36/302* (2023.05); *H04W 36/00837* (2018.08)

(58) Field of Classification Search
CPC ... H04L 1/0009; H04L 1/0014; H04L 1/0015; H04L 1/0023; H04W 36/0011;
(Continued)

(56) References Cited

U.S. PATENT DOCUMENTS

| 2016/0226785 A1* | 8/2016 | Khay-Ibbat | ........... H04W 24/08 |
| 2016/0261511 A1* | 9/2016 | Al-Shalash | ......... H04L 65/1069 |
(Continued)

FOREIGN PATENT DOCUMENTS

| CN | 1322092 A | 11/2001 |
| CN | 109155943 A | 1/2019 |
| WO | 2006126964 A2 | 11/2006 |

OTHER PUBLICATIONS

RFC 3267, J.Sjoberg et al, "Real-Time Transport Protocol (RTP) Payload Format and File Storage Format for the Adaptive Multi-Rate (AMR) and Adaptive Multi-Rate Wideband (AMR-WB) Audio Codecs," Network Working Group, Jun. 2002, 49 pages.

(Continued)

*Primary Examiner* — Obaidul Huq
(74) *Attorney, Agent, or Firm* — Conley Rose, P.C.

(57) ABSTRACT

A coding rate adjustment method, where a terminal device may determine a signal strength change rate of a wireless network, and send the signal strength change rate to a first access network device. The terminal device receives a first coding rate from a media processing device, where the first coding rate is determined based on the signal strength change rate. Then, the terminal device codes audio and video data based on the first coding rate, which can better reflect a current wireless network environment. The terminal device codes the audio and video data based on the first coding rate.

21 Claims, 9 Drawing Sheets

(58) Field of Classification Search
CPC ......... H04W 36/302; H04W 36/00837; H04W
36/0044; H04W 28/22; H04W 28/04
USPC ....................................... 370/310, 328, 329
See application file for complete search history.

(56) References Cited

U.S. PATENT DOCUMENTS

2019/0349118 A1*  11/2019  Chang .................. H04W 28/22
2021/0006603 A1*   1/2021  Park ................ H04N 21/44209

OTHER PUBLICATIONS

RFC 4867, J.Sjoberg et al, "RTP Payload Format and File Storage
Format for the Adaptive Multi-Rate (AMR) and Adaptive Multi-
Rate Wideband (AMR-WB) Audio Codecs," Apr. 2007, 59 pages.
3GPP TSG-RAN WG2 #95bis R2-166859, "Details of RAN-
assisted codec rate adaptation," Kaohsiung, Taiwan, Oct. 10-14,
2016, 6 pages.

* cited by examiner

CODING RATE ADJUSTMENT METHOD AND RELATED DEVICE

CROSS-REFERENCE TO RELATED APPLICATIONS

This is a continuation of International Patent Application No. PCT/CN2021/106044, filed on Jul. 13, 2021, which claims priority to Chinese Patent Application No. 202010848146.7, filed on Aug. 21, 2020. The disclosures of the aforementioned applications are hereby incorporated by reference in their entireties.

TECHNICAL FIELD

This disclosure relates to the field of communication technologies, and in particular, to a coding rate adjustment method and a related device.

BACKGROUND

In a communication system, a terminal device may adjust a coding scheme, a coding rate, or a quantity of bits of an error-correcting code as a wireless environment changes, to ensure speech quality and balance data compression and error tolerance. For example, the terminal device may perform adaptive multi-rate (AMR) coding rate adjustment on speech based on uplink quality, cell load, or an uplink signal-to-interference-plus-noise ratio (SINR).

However, signal attenuation may be fast when the terminal device enters a weak coverage area (for example, a network edge area, a floor/indoor area, a shadow area, or a fast fading area) or an area with high network load (for example, an area with a large quantity of access users). For example, for a terminal device (for example, a vehicle supporting an internet of vehicles or a handheld terminal in a traveling vehicle) with high mobility, when the terminal device enters the weak coverage area, the terminal device may pass through the weak coverage area in a short period of time due to a fast-moving speed of the terminal device. If AMR coding rate adjustment is still performed based on the uplink quality, the terminal device may have passed through the weak coverage area when a base station deliver s an AMR coding rate adjustment message to the terminal device. In other words, an AMR coding rate is not adjusted when the terminal device passes through the weak coverage area. As a result, a probability of interrupting communication of the terminal device in the weak coverage area is increased.

SUMMARY

Embodiments of this disclosure provide a coding rate adjustment method and a related device, to reduce a probability of interrupting communication of a terminal device.

According to a first aspect, an embodiment of this disclosure provides a coding rate adjustment method. The method may be performed by a terminal device. The terminal device may determine a signal strength change rate of a wireless network, and send the signal strength change rate to a first access network device. The terminal device receives a first coding rate from a media processing device. The first coding rate is determined based on the signal strength change rate. The terminal device codes audio and video data based on the first coding rate.

It can be learned that the terminal device may obtain the signal strength change rate of the wireless network, and may obtain the first coding rate determined based on the signal strength change rate. The first coding rate more satisfies a current network environment, and the terminal device codes the audio and video data based on the first coding rate, to help reduce a packet loss rate, and reduce a probability of interrupting communication of the terminal device.

In a possible design, the terminal device sends a session establishment request message to a session processing device. The session establishment request message includes detection capability information of the terminal device. The terminal device receives a session establishment response message from the session processing device. The session establishment response message is used to indicate the terminal device to detect the signal strength change rate. The terminal device starts to detect the signal strength change rate based on the session establishment response message.

It can be learned that the terminal device needs to receive the response message from the session processing device, and then start to detect the signal strength change rate, to help the terminal device to obtain the signal strength change rate of the wireless network in a timely manner and adjust a coding rate when network signal strength rapidly changes.

In a possible design, if a handover condition for triggering a cell handover is reached, the terminal device receives a handover message from the first access network device. The handover message includes a second coding rate. The second coding rate is determined based on the signal strength change rate, and the cell handover means that the terminal device is handed over from the first access network device to a second access network device.

It can be learned that, when the network signal strength changes rapidly, the terminal device not only can adjust a coding rate of the audio and video data, but also can be handed over to a cell with better network signal strength, to help reduce a probability of interrupting communication.

In a possible design, the terminal device receives a measurement control request message from the first access network device. The measurement control request message includes indication information used to indicate the terminal device to obtain signal strength, and a sampling periodicity of the signal strength. The terminal device determines the signal strength change rate based on the signal strength and the sampling periodicity of the signal strength.

It can be learned that the terminal device determines the signal strength change rate of the wireless network based on the signal strength of the wireless network and the sampling periodicity, and the signal strength change rate more accurately reflects the current network environment.

According to a second aspect, an embodiment of this disclosure provides a coding rate adjustment method. The method may be performed by a network device. For example, the network device may be a media processing device in a core network. The media processing device receives a first notification message from a session processing device. The first notification message includes detection capability information of a terminal device, and the detection capability information is used to indicate that the terminal device has a capability of detecting a signal strength change rate. The media processing device receives a second coding rate from a first access network device. The second coding rate is determined based on the signal strength change rate. The media processing device determines, based on coding rate information and the second coding rate, a first coding rate at which the terminal device codes audio and video data, and sends the first coding rate to the terminal device.

It can be learned that the media processing device can determine, based on a signal strength change rate of a wireless network, the first coding rate at which the terminal device codes the audio and video data, to help reduce a probability of interrupting communication of the terminal device.

In a possible design, the media processing device may further receive coding rate information of the terminal device. The coding rate information includes a coding rate set of the terminal device. If the second coding rate does not belong to the coding rate set of the terminal device, the media processing device obtains the first coding rate from the coding rate set of the terminal device. The first coding rate is less than and closest to the second coding rate.

It can be learned that the first coding rate determined by the media processing device is a rate in the coding rate set of the terminal device. In other words, the first coding rate is a coding rate value that may be obtained by the terminal device through adjustment, to help reduce a probability of interrupting communication of the terminal device.

In a possible design, the media processing device may send the coding rate information to the first access network device. The coding rate information includes a coding rate set of the terminal device. If the second coding rate belongs to the coding rate set of the terminal device, the media processing device determines that the first coding rate is equal to the second coding rate.

It can be learned that when the second coding rate determined by the first access network device is a coding rate value that may be obtained by the terminal device through adjustment, the media processing device only needs to verify that the second coding rate is the first coding rate of the terminal device.

According to a third aspect, an embodiment of this disclosure provides a coding rate adjustment method. The method may be performed by a first access network device. The first access network device receives a signal strength change rate of a wireless network from a terminal device, and determines a second coding rate based on the signal strength change rate of the wireless network. The first access network device sends the second coding rate to a media processing device.

It can be learned that the first access network device may determine a target coding rate of the terminal device based on the signal strength change rate of the wireless network, to help reduce a probability of interrupting communication of the terminal device.

In a possible design, the first access network device may further receive a second notification message from the media processing device. The second notification message includes detection capability information of the terminal device, and the detection capability information is used to indicate that the terminal device has a capability of detecting the signal strength change rate. The first access network device sends a measurement control request message to the terminal device. The measurement control request message is used to indicate the terminal device to measure the signal strength change rate.

It can be learned that the first access network device may determine that the terminal device has the capability of detecting the signal strength change rate, and send the measurement control request message to the terminal device, such that the terminal device obtains the signal strength change rate of the wireless network.

In a possible design, the first access network device may determine, as the second coding rate from the pre-obtained coding rate set of the terminal device, a coding rate corresponding to the signal strength change rate.

It can be learned that the first access network device may determine the target coding rate of the terminal device from the coding rate set of the terminal device based on the signal strength change rate of the wireless network.

In a possible design, if a handover condition for triggering a cell handover is reached, the first access network device sends a handover message to a second access network device. The handover message includes the second coding rate. The cell handover is that the terminal device is handed over from the first access network device to the second access network device.

It can be learned that, when network signal strength changes rapidly, the terminal device not only can adjust a coding rate of audio and video data, but also can be handed over to a cell with better network signal strength, to help reduce a probability of interrupting communication.

According to a fourth aspect, an embodiment of this disclosure provides a terminal device, including a transceiver and a processor. The processor is configured to determine a signal strength change rate of a wireless network. The transceiver is configured to: send a signal strength change rate to a first access network device, and receive a first coding rate from a media processing device. The first coding rate is determined based on the signal strength change rate. The processor is further configured to code audio and video data based on the first coding rate.

In a possible design, the transceiver is further configured to send a session establishment request message to a session processing device. The session establishment request message includes detection capability information of the terminal device, and the detection capability information is used to indicate that the terminal device has a capability of detecting the signal strength change rate. The transceiver is further configured to receive a session establishment response message from the session processing device. The session establishment response message is used to indicate the terminal device to detect the signal strength change rate. The processor is further configured to start to detect the signal strength change rate based on the session establishment response message.

In a possible design, if a handover condition for triggering a cell handover is reached, the transceiver is further configured to receive a handover message from the first access network device. The handover message includes a second coding rate. The cell handover is that the terminal device is handed over from the first access network device to a second access network device.

In a possible design, the transceiver is further configured to receive a measurement control request message from the first access network device. The measurement control request message includes indication information used to indicate the terminal device to obtain signal strength, and a sampling periodicity of the signal strength. The processor is configured to determine the signal strength change rate based on the signal strength and the sampling periodicity of the signal strength.

According to a fifth aspect, an embodiment of this disclosure provides a network device, including a transceiver and a processor. The transceiver is configured to receive a first notification message from a session processing device. The first notification message includes detection capability information of a terminal device, and the detection capability information is used to indicate that the terminal device has a capability of detecting a signal strength change rate. The transceiver is further configured to receive a second coding rate from a first access network device. The second coding rate is determined based on the signal strength change rate. The processor is configured to determine, based on coding rate information and the second coding rate, a first coding rate at which the terminal device codes audio and video data. The transceiver is further configured to send the first coding rate to the terminal device.

In a possible design, the first notification message further includes the coding rate information, and the coding rate information includes a coding rate set of the terminal device. If the second coding rate does not belong to the coding rate set, the processor is further configured to obtain the first coding rate from the coding rate set. The first coding rate is less than and closest to the second coding rate.

In a possible design, the transceiver is further configured to send the coding rate information to the first access network device. The coding rate information includes the coding rate set of the terminal device. If the second coding rate belongs to the coding rate set, the processor is further configured to determine that the first coding rate is equal to the second coding rate.

According to a sixth aspect, an embodiment of this disclosure provides an access network device, including a transceiver and a processor. The transceiver is configured to receive a signal strength change rate of a wireless network from a terminal device. The processor is configured to determine a second coding rate based on the signal strength change rate of the wireless network. The transceiver is further configured to send the second coding rate to a media processing device.

In a possible design, the transceiver is further configured to receive a second notification message from the media processing device. The second notification message includes detection capability information of the terminal device, and the detection capability information is used to indicate that the terminal device has a capability of detecting the signal strength change rate. The transceiver is further configured to send a measurement control request message to the terminal device. The measurement control request message is used to indicate the terminal device to measure the signal strength change rate.

In a possible design, the second notification message further includes coding rate information of the terminal device, and the coding rate information includes a coding rate set of the terminal device. The processor is further configured to determine, as the second coding rate from the coding rate set, a coding rate corresponding to the signal strength change rate.

In a possible design, if a handover condition for triggering a cell handover is reached, the transceiver is further configured to send a handover message to a second access network device. The handover message includes the second coding rate. The cell handover is that the terminal device is handed over from the first access network device to the second access network device.

According to a seventh aspect, an embodiment of this disclosure provides a terminal device. The device has a function of implementing the coding rate adjustment method provided in the first aspect. The function may be implemented by hardware, or may be implemented by hardware executing corresponding software. The hardware or the software includes one or more modules corresponding to the function.

According to an eighth aspect, an embodiment of this disclosure provides a network device. The device has a function of implementing the coding rate adjustment method provided in the second aspect. The function may be implemented by hardware, or may be implemented by hardware executing corresponding software. The hardware or the software includes one or more modules corresponding to the function.

According to a ninth aspect, an embodiment of this disclosure provides an access network device. The device has a function of implementing the coding rate adjustment method provided in the third aspect. The function may be implemented by hardware, or may be implemented by hardware executing corresponding software. The hardware or the software includes one or more modules corresponding to the function.

According to a tenth aspect, an embodiment of this disclosure provides a communication system. The communication system includes the terminal device provided in the third aspect or the sixth aspect, the network device provided in the fourth aspect or the seventh aspect, and the access network device provided in the fifth aspect or the eighth aspect.

According to an eleventh aspect, an embodiment of this disclosure provides a computer-readable storage medium. The computer-readable storage medium stores a program or instructions. When the program or instructions are run on a computer, the computer is enabled to perform the method according to any one of the first aspect or the possible implementations of the first aspect.

According to a twelfth aspect, an embodiment of this disclosure provides a computer-readable storage medium. The computer-readable storage medium stores a program or instructions. When the program or instructions are run on a computer, the computer is enabled to perform the method according to any one of the second aspect or the possible implementations of the second aspect.

According to a thirteenth aspect, an embodiment of this disclosure provides a computer-readable storage medium. The computer-readable storage medium stores a program or instructions. When the program or instructions are run on a computer, the computer is enabled to perform the method according to any one of the third aspect or the possible implementations of the third aspect.

According to a fourteenth aspect, an embodiment of this disclosure provides a chip or a chip system. The chip or the chip system includes at least one processor and an interface, the interface and the at least one processor are interconnected through a line, and the at least one processor is configured to execute a computer program or instructions, to perform the method according to any one of the first aspect or the possible implementations of the first aspect.

According to a fifteenth aspect, an embodiment of this disclosure provides a chip or a chip system. The chip or the chip system includes at least one processor and an interface, the interface and the at least one processor are interconnected through a line, and the at least one processor is configured to execute a computer program or instructions, to perform the method according to any one of the second aspect or the possible implementations of the second aspect.

According to a sixteenth aspect, an embodiment of this disclosure provides a chip or a chip system. The chip or the chip system includes at least one processor and an interface, the interface and the at least one processor are interconnected through a line, and the at least one processor is configured to execute a computer program or instructions, to perform the method according to any one of the third aspect or the possible implementations of the third aspect.

The interface in the chip may be an input/output interface, a pin, a circuit, or the like. The chip system may be a system on chip (SOC), a baseband chip, or the like. The baseband chip may include a processor, a channel coder, a digital signal processor, a modem, an interface module, or the like.

In a possible implementation, the chip or the chip system in this disclosure further includes at least one memory, and the at least one memory stores instructions. The memory may be a storage unit inside the chip, for example, a register or a buffer, or may be a storage unit (for example, a read-only memory or a random access memory) of the chip.

DESCRIPTION OF EMBODIMENTS

Figure 1:
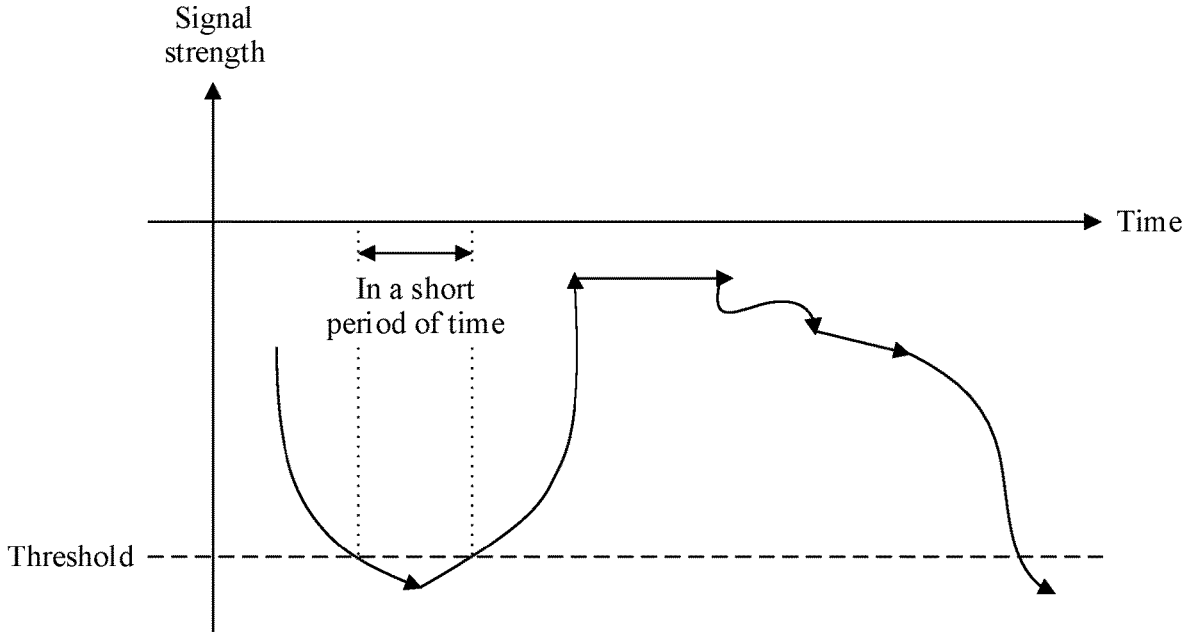
FIG. 1 is a schematic diagram in which signal strength changes with time when a terminal device with high mobility crosses a weak coverage area.

The following describes technical solutions in embodiments of this disclosure with reference to the accompanying drawings in embodiments of this disclosure.

In a mobile communication system, a terminal device may move within the system. When the terminal device moves to a weak coverage area (for example, a network edge area, a floor/indoor area, a shadow area, or a fast fading area) or an area with high network load (for example, an area with a large quantity of access users), network signal quality may be gradually degraded, and there may even be a risk of interrupting communication.

To maintain a continuous communication service, the terminal device may adjust a coding scheme, a coding rate, or a quantity of bits of an error-correcting code as a wireless environment changes, to ensure speech quality. Optionally, the terminal device may trigger an event report based on signal measurement results of a serving cell and a neighboring cell, to be handed over to a cell with better signal quality.

The following provides descriptions using an example in which the terminal device maintains the continuous communication service by adjusting the coding rate.

For example, for audio and video data of the terminal device, the terminal device may perform adaptive multi-rate audio compression (AMR compression), to ensure quality of the audio and video data. The AMR is adaptive multi-rate coding. The coding scheme, the rate, and the quantity of bits of the error-correcting code may be adjusted based on an actual situation of a transmission channel, to ensure the speech quality and balance data compression and error tolerance. A full rate of AMR coding provides eight rates of 12.2 kilobits per second (kbps), 10.2 kbps, 7.95 kbps, 7.4 kbps, 6.7 kbps, 5.9 kbps, 5.15 kbps, and 4.75 kbps, and a half rate of the AMR provides five rates of 7.4 kbps, 6.7 kbps, 5.9 kbps, 5.15 kbps, and 4.75 kbps. For example, total quantities of bits obtained after speech coding and channel coding are performed on a speech block of 20 milliseconds (ms) are comparable (where the full rate is 456 bits, and the half rate is 228 bits). If air interface quality is good, a speech coding rate can be properly increased. To be more specific, there are more speech coding bits and fewer channel coding bits. If air interface quality is not good, the speech coding rate needs to be reduced. To be more specific, there are more channel coding protection check bits.

Currently, there are mainly the following several types of AMR speech rate control schemes: uplink quality-based speech coding rate adjustment, cell load-based speech coding rate adjustment, and uplink signal to interference plus noise ratio (SINR)-based speech coding rate adjustment.

The uplink quality-based speech coding rate adjustment may be adjusting a coding rate of an uplink speech service based on uplink channel quality and speech quality. For example, when the uplink channel quality and the speech quality are good, a high speech coding rate is used to improve the speech quality; or when the uplink channel quality and speech quality are poor, a low speech coding rate is used to reduce an uplink packet loss rate and improve uplink speech coverage.

The load-based speech coding rate adjustment may be triggering coding rate adjustment based on cell uplink load and a speech service radio link control (RLC) segmentation state. For example, when a cell uplink air interface resource meets a high load condition and RLC segmentation is performed on the speech service, occupation of resources such as a cell radio bearer (RB) and a control channel element (CCE) by a single speech user is reduced, to increase a quantity of cell speech users or a cell uplink throughput.

The SINR-based speech coding rate adjustment may be triggering coding rate adjustment when an uplink SINR is poor. The low speech coding rate is used to reduce the uplink packet loss rate, reduce a probability that a speech problem that a word is swallowed/intermittent occurs, and improve user perception of speech.

It can be learned that according to the speech coding rate adjustment scheme, when the network environment changes, for a terminal device with low mobility, a probability of interrupting communication of the terminal device may be reduced. However, with development of 5th generation (5G) mobile communication and an internet of things, there are more terminal devices with high mobility (for example, a vehicle supporting an internet of vehicles or a handheld terminal in a traveling vehicle), and there is a higher requirement on network signal quality.

For example, the terminal device with high mobility usually travels at a speed of 60 kilometers per hour (KM/h) to 120 kilometers per hour when traveling at a high speed. A decreasing degree in a signal change existing when the terminal device with high mobility crosses the weak coverage area is much greater than that of the terminal device with low mobility. FIG. 1 is a schematic diagram in which signal strength changes with time when a terminal device with high mobility crosses a weak coverage area. Due to a fast-moving speed of the terminal device with high mobility, when the terminal device crosses the weak coverage area, signal strength of a wireless network may be reduced to (or below) a threshold of signal strength corresponding to communication interruption in a short period of time. In addition, because the period of time is short, if AMR coding rate adjustment is still performed based on uplink quality, the terminal device may have passed through the weak coverage area when a base station deliver s an AMR coding rate adjustment message to the terminal device. In other words, an AMR coding rate is not adjusted when the terminal device passes through the weak coverage area. As a result, a probability of interrupting communication of the terminal device in the weak coverage area is increased.

To resolve the foregoing problem, an embodiment of this disclosure provides a coding rate adjustment method. According to the method, it is conducive to reducing a probability of interrupting communication of a terminal device in a weak coverage area or an area with high network load, to ensure quality of service of communication.

Figure 2:
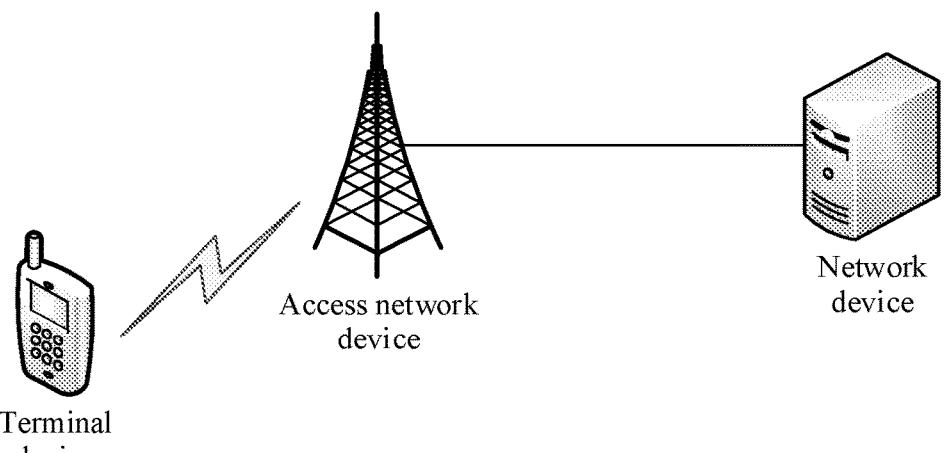
FIG. 2 is a schematic diagram of a communication system according to an embodiment of this disclosure.

The coding rate adjustment method provided in this embodiment of this disclosure may be applied to a communication system. FIG. 2 is a schematic diagram of a communication system according to an embodiment of this disclosure. The communication system includes a terminal device, a network device, and an access network device. The terminal device and the access network device are connected through a radio air interface, and the access network device and the network device are connected in a wireless or wired manner, as shown in FIG. 2.

The terminal device may be a device having a wireless transceiver function, or the terminal device may be a chip. The terminal device may be a user equipment (UE), a mobile phone, a tablet computer (pad), a computer having a wireless transceiver function, a terminal device in virtual reality (VR), a terminal device in an augmented reality (AR), an intelligent vehicle in an internet of vehicles, a vehicle-mounted terminal device, a terminal device in telemedicine (or remote medical), a terminal device in smart grid, a wearable terminal device (for example, a helmet), an internet of vehicles, device-to-device (D2D) communication, a sensor in machine communication, or the like.

The access network device may be any device having a wireless transceiver function, and provide a wireless communication service for a terminal device within a coverage area. The access network device may include but is not limited to an evolved NodeB (eNB or eNodeB) in a Long-Term Evolution (LTE) system, a gNodeB (gNB) or a transceiver point (e.g., a transmission reception point (TRP)) in a new generation radio access technology (or new radio (NR) access technology), a subsequently evolved base station in 3$^{rd}$ Generation Partnership Project 3GPP, an access node in a Wi-Fi system, a wireless relay node, a wireless backhaul node, and the like.

The network device may be a functional device in a core network, and is configured to implement different functions. The network device may include an Internet Protocol (IP) Multimedia Subsystem (IMS), a mobility management entity (MIME), a policy and charging rules function (PCRF) device, or the like in 4th generation (4G) mobile communication; or may include an access and mobility management function (AMF) device, a session management function (SMF) device, a user plane function (UPF) device, a policy control function (PCF) device, a unified data management function (UDM) device, a media processing function (MPF) device, or the like in 5G; or may include a function device in a core network of a future mobile communication network. This is not limited in this embodiment.

The AMF is mainly responsible for mobility management in a mobile network, for example, user location updating, user registration network, or a user handover. The SMF is mainly responsible for session management in the mobile network, for example, session establishment, modification, and release. Specific functions are assigning an IP address to a user, choosing to provide a packet forwarding function, or the like. The PCF is responsible for providing a policy for the AMF and the SMF, for example, a quality of service (QoS) policy, or a slice selection policy. The UDM is configured to store user data, for example, subscription information, or authentication/authorization information. The UPF is mainly responsible for processing a user packet, for example, forwarding or charging. The MPF is mainly responsible for manage audio and video data in the mobile network, for example, determining a coding rate of the audio and video data.

To help understand embodiments of this disclosure, the following describes technical terms in embodiments of this disclosure.

A weak coverage area means that an average reference signal received power (RSRP) of a current area is lower than a specific threshold. For example, the weak coverage area may be located between a cell 1 and a cell 2, and is located in an edge area of the cell 1 and the cell 2. The cell 1 and the cell 2 are any two adjacent cells. A user in the weak coverage area possibly cannot receive a signal properly.

An area with high network load means that a terminal device access amount in a current area exceeds a specific threshold. For example, if a threshold of a terminal device access amount of a cell 1 is 100 and a quantity of terminal devices that currently access the cell 1 is 150, the cell 1 is an area with high network load.

Signal strength (e.g., received signal strength indication (RSSI)) is an indication of measuring received signal strength of a terminal device, and is used to determine quality of a wireless signal. For example, transmission is performed between a mobile phone and a base station using the wireless signal. When the mobile phone is close to the base station, signal strength is good, and when the mobile phone is far away from the base station, signal strength is poor. Currently, two signal units are defined in Android: an absolute value of power (e.g., decibels per milliwatt (dBm)) and an alone signal unit (asu), and a relationship between the absolute value of power and the alone signal unit is dBm=113+2*asu. Herein, asu is an analog signal, and represents a rate at which a terminal device transfers a location of the terminal device to a nearby access network device, and dB is a value representing an absolute value of power. If the power is one milliwatt (mW), the absolute value of power is 0 dBm after a unit is converted into dBm.

A current signal strength value of the terminal device and a signal status corresponding to the signal strength value are shown in Table 1. A unit of signal strength in Table 1 is dBm. It can be learned that in a moving process of the terminal device, to ensure a continuous communication service, signal strength of the terminal device cannot be lower than −100 dBm.

TABLE 1

| Record table of a signal strength value of a terminal device and a signal state corresponding to the signal strength value | |
|---|---|
| Signal strength value (dBm) | Signal state |
| −30 to −50 | Strongest signal |
| −50 to −60 | Good signal |
| −60 to −70 | Fine signal |
| −70 to −80 | Slightly weak signal |
| −80 to −90 | Very weak signal |
| −90 to −100 | Faint signal |
| Below −100 | Cannot communicate |

Figure 3:
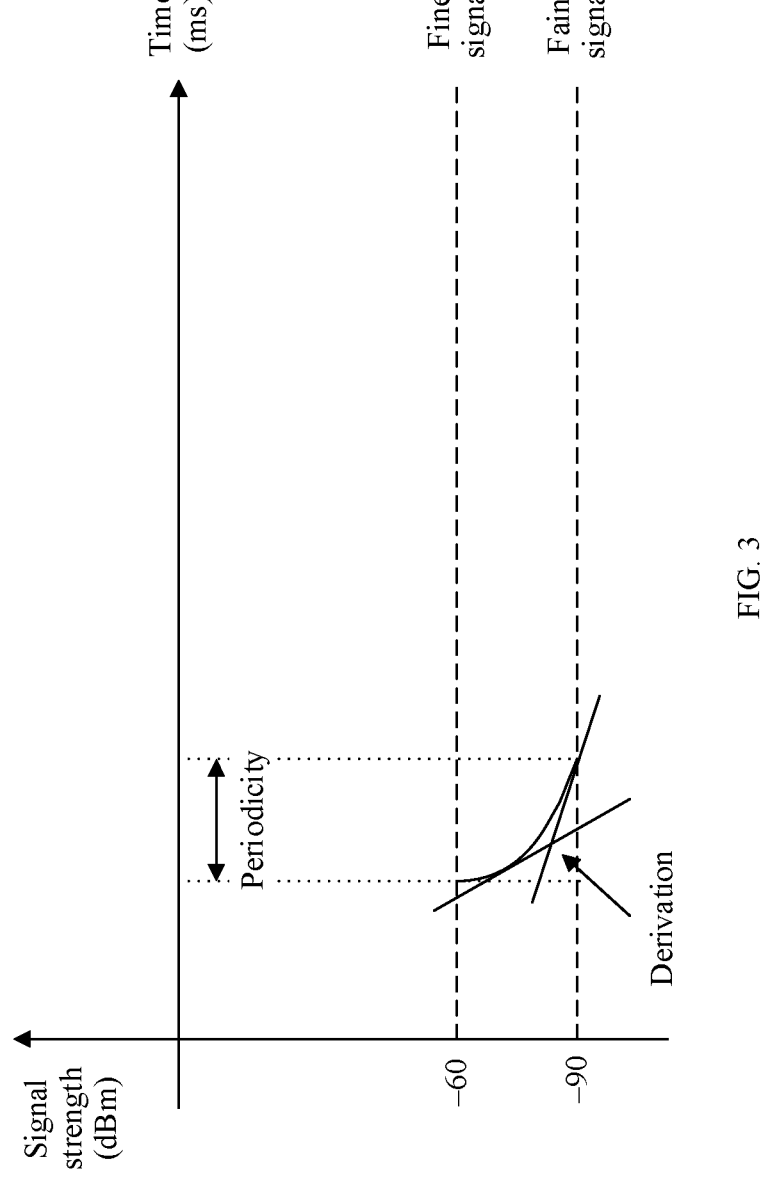
FIG. 3 is a schematic diagram of a signal strength change rate according to an embodiment of this disclosure.

For a signal strength change rate, in a plurality of consecutive periodicities (assumed to be 10 ms, which can be adjusted based on an actual requirement), a terminal device observes signal strength of the terminal device, and calculates signal strength within a periodicity based on a related algorithm. The signal strength within the unit period is the signal strength change rate. For example, the terminal device may calculate the signal strength change rate through derivation, where $f(t)$ represents a function of the signal strength, and $f(t)$ is derived at a moment t in a sampling periodicity of each signal strength (for example, a start moment of the sampling periodicity of the signal strength). A signal strength change rate corresponding to each moment t may be determined, as shown in FIG. 3. A calculation method of the derivation is merely an example, and the terminal device may calculate the signal strength change rate based on another algorithm. This is not limited in this embodiment.

The following provides descriptions with reference to example embodiments.

Figure 4:
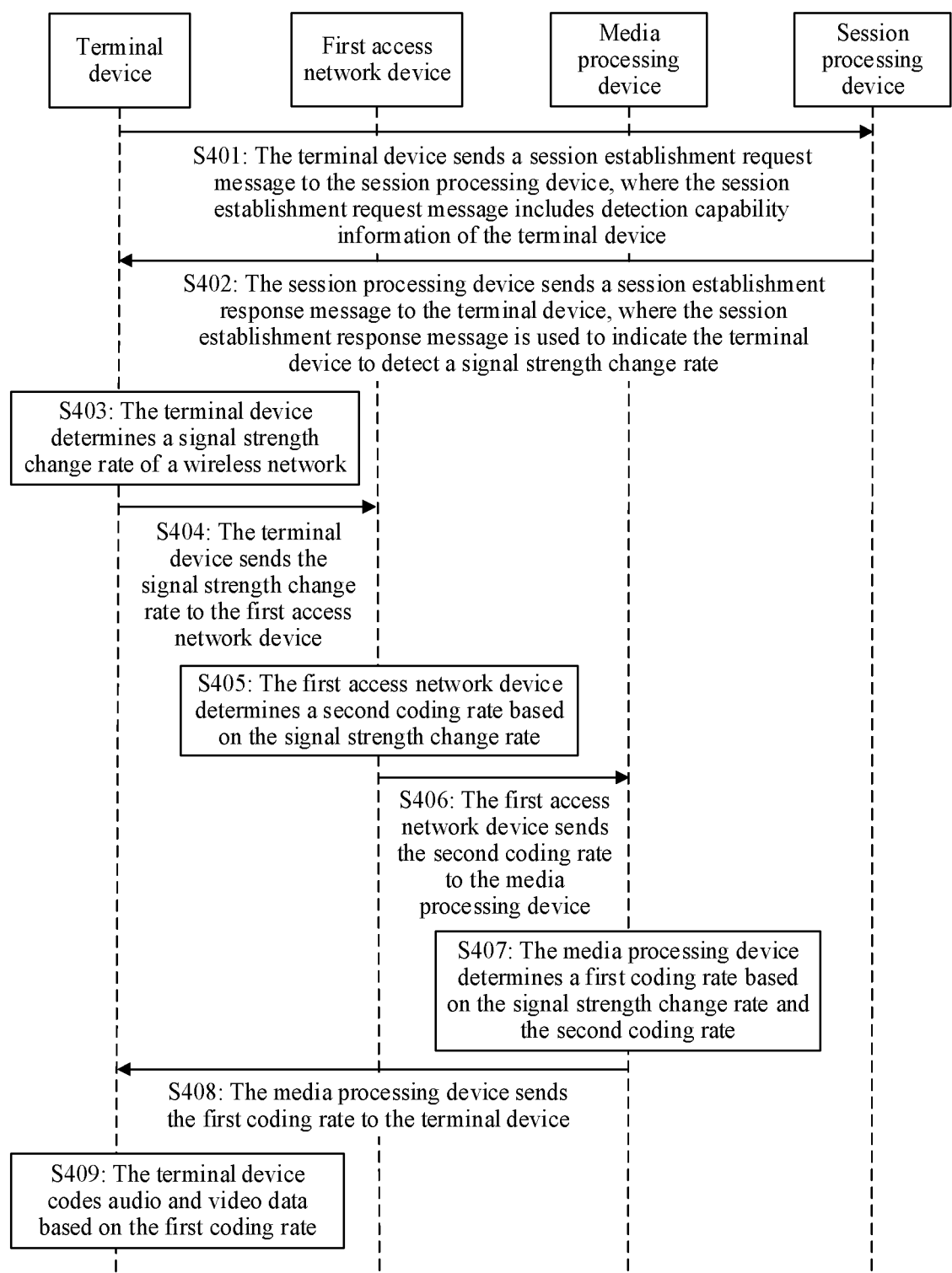
FIG. 4 is a schematic flowchart of a coding rate adjustment method according to an embodiment of this disclosure.

FIG. 4 shows a coding rate adjustment method according to an embodiment of this disclosure. The method may be implemented through interaction between a terminal device, a network device, and an access network device. In this embodiment of this disclosure, the access network device includes a first access network device, and the network device includes a media processing device and a session processing device in a core network. In the coding rate adjustment method in this embodiment of this disclosure, adjusting a coding rate based on a signal strength change rate is mainly described. The method may include the following steps.

S401: The terminal device sends a session establishment request message to the session processing device, where the session establishment request message includes detection capability information of the terminal device. Correspondingly, the session processing device receives the session establishment request message.

S402: The session processing device sends a session establishment response message to the terminal device, where the session establishment response message is used to indicate the terminal device to detect a signal strength change rate. Correspondingly, the terminal device receives the session establishment response message from the session processing device.

S403: The terminal device determines a signal strength change rate of a wireless network.

S404: The terminal device sends the signal strength change rate to the first access network device. Correspondingly, the first access network device receives the signal strength change rate.

S405: The first access network device determines a second coding rate based on the signal strength change rate.

S406: The first access network device sends the second coding rate to the media processing device. Correspondingly, the media processing device receives the second coding rate.

S407: The media processing device determines a first coding rate based on the signal strength change rate and the second coding rate.

S408: The media processing device sends the first coding rate to the terminal device. Correspondingly, the terminal device receives the first coding rate.

S409: The terminal device codes audio and video data based on the first coding rate.

The terminal device may send the session establishment request message to the session processing device. That is, S401 is performed. The session establishment request message includes the detection capability information of the terminal device, and the detection capability information is used to indicate that the terminal device has a capability of detecting the signal strength change rate. In other words, because a coding rate of the audio and video data of the terminal device in this embodiment is associated with the signal strength change rate, the terminal device in this embodiment needs to support to detect the signal strength change rate.

Optionally, the session establishment request message may further include coding rate information and/or location information. The coding rate information may include one or more of the following: the terminal device has a coding rate adjustment capability, an initial coding rate of the terminal device, and a coding rate set of the terminal device.

That the terminal device has the coding rate adjustment capability means that the terminal device supports to adjust the coding rate of the audio and video data when a wireless network environment deteriorates to an extent. For example, when the terminal device moves to a weak coverage area at a high speed, the terminal device may support AMR rate adjustment of speech. The capability information may be indicated using different bit values. For example, if the terminal device has the coding rate adjustment capability, a value of the capability information in the session establishment request message sent by the terminal device to the session processing device is 1; or if the terminal device does not have the coding rate adjustment capability, a value of the capability information is 0.

The initial coding rate of the terminal device is a coding rate value preset for the terminal device. The coding rate value may be set for the terminal device at deliver y, or may be a corresponding coding rate value preset for the terminal device in different wireless network environments. This is not limited in this embodiment.

The coding rate set of the terminal device is a set of one or more coding rates that may be adjusted by the terminal device when the terminal device supports coding rate adjustment. For example, the coding rate set of the terminal device includes eight rates of 12.2 kbps, 10.2 kbps, 7.95 kbps, 7.4 kbps, 6.7 kbps, 5.9 kbps, 5.15 kbps, and 4.75 kbps provided by a full rate of AMR coding. The coding rate set of the terminal device may further include another rate (for example, another rate value provided by a half rate of AMR coding). This is not limited in this embodiment.

The location information of the terminal device is used to indicate a location at which the terminal device is currently located. For example, if the terminal device is a terminal device in an internet of vehicles (namely, having a characteristic of moving at a high speed), the location information of the terminal device may be carried in a cooperative awareness message (CAM). The session processing device may obtain the location information of the terminal device based on a CAM message periodically reported by the terminal device. Optionally, if the terminal device is not a terminal device in the internet of vehicles, the location information that is of the terminal device and that is carried in the session request message may be untrusty, and the session processing device needs to obtain the location information of the terminal device from a location server. For example, the session processing device may request the location information of the terminal device from the location server based on an identifier of the terminal device.

Optionally, before S401, both the first access network device and the second access network device connected to the session processing device may report a resource load situation of the wireless network to the session processing device. The resource load situation of the wireless network may include one or more of the following: signal strength of the wireless network, a terminal device access amount in the wireless network, bandwidth usage of the wireless network, and the like. The first access network device and the second access network device may report, in a periodical manner or in an event-triggered manner, the resource load situation of the wireless network to the session processing device to which the first access network device and the second access network device are connected. For example, when the first bandwidth usage of the wireless network exceeds a preset threshold, the first access network device may report "bandwidth usage of a current wireless network exceeds the preset threshold" to the session processing device to which the first access network device is connected.

The session processing device receives a session establishment request message from a mobile terminal, and identifies that the mobile terminal has a coding rate adjustment capability and a moving characteristic of the mobile terminal. If a condition for triggering coding rate adjustment is met, the session establishment response message sent by the session processing device to the terminal device is used to indicate the terminal device to detect the signal strength change rate. That is, S402 is performed. That the condition for triggering coding rate adjustment is met may include one or more of the following: A moving characteristic of the terminal device satisfies a characteristic of moving at a high speed, the terminal device is located in or is crossing a weak coverage area, the terminal device is located in or is crossing an area with high network load, the signal strength of the wireless network of the terminal device is lower than a signal strength threshold existing when the terminal device maintains a continuous communication service, and the like.

For example, it is assumed that the terminal device is an intelligent vehicle in the internet of vehicles, and the intelligent vehicle runs at a speed of 80 km/h. When the intelligent vehicle travels and enters a tunnel with a length of 2 km, if the session processing device identifies that the intelligent vehicle has the coding rate adjustment capability and has the characteristic of moving at a high speed, and determines that the tunnel that the intelligent vehicle enters is a weak coverage area, the session establishment response message sent by the session processing device to the intelligent vehicle is used to indicate the intelligent vehicle to start to detect the signal strength change rate.

Optionally, before S403, the session processing device may send the detection capability information and the coding rate information of the terminal device to the media processing device. Correspondingly, the media processing device receives the detection capability information and the coding rate information of the terminal device, and may determine that the terminal device has the capability of detecting the signal strength change rate and the coding rate adjustment capability, and determine a set of one or more coding rates that may be adjusted by the terminal device.

Optionally, the media processing device may send the detection capability information and/or the coding rate information of the terminal device to the first access network device. Correspondingly, the first access network device receives the detection capability information and/or the coding rate information from the media processing device. The following two cases may be included.

Case 1: The first access network device receives the detection capability information of the terminal device, and determines that the terminal device has the capability of detecting the signal strength change rate.

Case 2: The first access network device receives the detection capability information and the coding rate information of the terminal device, determines that the terminal device has the capability of detecting the signal strength change rate and the coding rate adjustment capability, and determines the set of one or more coding rates that may be adjusted by the terminal device.

In an implementation, regardless of whether the first access network device receives the detection capability information and/or the coding rate information of the terminal device sent by the media processing device, the first access network device may send a measurement control request message to the terminal device, to request to measure signal quality, or the like. In other words, the first access network device may periodically send the measurement control request message to the terminal device. Correspondingly, the terminal device may periodically report a measurement result (including information such as the signal strength).

Further, the terminal device in this embodiment not only measures the signal strength, but also needs to determine the signal strength change rate of the wireless network. Therefore, before S403, the first access network device identifies that the terminal device supports to detect the signal strength change rate, and the first access network device sends the measurement control request message to the terminal device. The measurement control request message is used to indicate the terminal device to measure the signal strength change rate.

Optionally, the measurement control request message sent by the first access network device to the terminal device may further carry capability information of the first access network device, and the capability information of the first access network device is used to indicate that the first access network device has a capability of determining a coding rate based on the signal strength change rate. In other words, the measurement control request message sent by the first access network device to the terminal device may explicitly indicate that the first access network device supports to determine the coding rate based on the signal strength change rate. The measurement control request message sent by the first access network device to the terminal device may not carry the capability information of the first access network device. In other words, the first access network device may implicitly support to recommend, based on the signal strength change rate, a coding rate matching the signal strength change rate. This is not limited in this embodiment.

The terminal device receives the session establishment response message from the session processing device, and receives the measurement control request message from the first access network device, and the terminal device starts signal quality observation, to measure current signal quality, determine the signal strength change rate, and the like. That is, S403 is performed. For a method for determining the signal strength change rate by the terminal device, refer to the description of the signal strength and the signal strength change rate in the foregoing embodiments. Details are not described herein again. After determining the signal strength change rate, the terminal device may send the signal strength change rate to the first access network device. That is, S404 is performed.

The first access network device receives the signal strength change rate from the terminal device, and may determine the second coding rate based on the signal strength change rate. That is, S405 is performed. The second coding rate indicates a coding rate that is recommended by the first access network device to be used by the terminal device to code the audio and video data. Based on the description of the two cases that may be included when the first access network device receives the detection capability information and/or the coding rate information from the media processing device in the foregoing embodiment, two cases are also correspondingly included when the first access network device determines the second coding rate based on the signal strength change rate:

Case 1: If the first access network device does not previously receive the coding rate information of the terminal device, the second coding rate determined by the first access network device only matches a signal strength change rate and signal strength of a current wireless network.

In other words, because the first access network device does not receive the initial coding rate and the coding rate set of the terminal device, the first access network device can recommend, based on only the signal strength of the current wireless network and a sampling periodicity of the signal strength, a coding rate matching only the signal strength change rate and the signal strength of the current wireless network. For example, a base station may determine the second coding rate of the terminal device based on historical record information of the coding rate and the signal strength, and a load situation (for example, a quantity of access users) of the base station. Table 2 is a record table of a coding rate used by a terminal device to code audio and video data, signal strength, and a sampling periodicity of the signal strength according to an embodiment of this disclosure.

TABLE 2

| Record table of a coding rate used by a terminal device to code audio and video data, signal strength, and a sampling periodicity of the signal strength | | | |
|---|---|---|---|
| Coding rate used by a terminal device to code audio and video data (kbps) | Signal strength (dBm) | Sampling periodicity of the signal strength (ms) | Quantity of access users (person) |
| 10 | −50 | 10 | 100 |
| 7 | −70 | 10 | 150 |
| 5 | −90 | 10 | 200 |

Although the record table shown in Table 2 does not directly reflect the signal strength change rate, because the signal strength change rate may be determined based on the signal strength and the sampling periodicity of the signal strength, the first access network device may determine a matched coding rate from Table 2 based on a signal strength change rate of the wireless network, signal strength, and a quantity of access users that are received. For example, the signal strength change rate of the current wireless network is −5 dBm/ms, the signal strength is −50 dBm, and the quantity of access users is 100. Based on Table 2, the first access network device determines that the second coding rate is 10. It should be noted that Table 2 is merely an example, and a correspondence among the coding rate used by the terminal device to code the audio and video data, the signal strength, the sampling periodicity of the signal strength, and the quantity of access users may be recorded in another form. This is not limited in this embodiment.

Case 2: If the first access network device has previously received the detection capability information and the coding rate information of the terminal device, the first access network device needs to select, from the coding rate set of the terminal device, the coding rate matching the signal strength change rate and the signal strength of the current wireless network.

In other words, because the first access network device has learned of in advance a coding rate set supported by the terminal device, the second coding rate determined by the first access network device is one coding rate in the coding rate set of the terminal device, and the coding rate matches the signal strength change rate and the signal strength of the current wireless network. The coding rate set supported by the terminal device may be an AMR narrowband (AMR-NB) coding rate set {4.75 kbps, 5.15 kbps, 5.90 kbps, 6.70 kbps, 7.4 kbps, 7.95 kbps, 10.20 kbps, 12.20 kbps} or an AMR wideband (AMR-WB) coding rate set {6.6 kbps, 8.85 kbps, 12.65 kbps, 14.25 kbps, 15.85 kbps, 18.25 kbps, 19.85 kbps, 23.05 kbps, 23.85 kbps}. For example, the coding rate set that is of the terminal device and that is received by the first access network device in advance is the AMR-NB coding rate set. The signal strength change rate of the current wireless network is −5 dBm/ms, and the signal strength is −50 dBm. The first access network device may determine, based on the coding rate set, the signal strength change rate, and the signal strength, that the second coding rate of the terminal device is 7.95 kbps.

The first access network device may send the second coding rate to the media processing device. That is, S406 is performed. Correspondingly, the media processing device receives the second coding rate. It should be noted that, because two cases are included when the first access network device determines the second coding rate based on the signal strength change rate, the media processing device needs to verify the second coding rate determined in the two cases, and determine whether the second coding rate is the first coding rate at which the terminal device codes the audio and video data. That is, S407 is performed. The first coding rate represents a target coding rate that satisfies the signal strength change rate of the current wireless network.

When the media processing device determines the first coding rate based on the signal strength change rate and the second coding rate, two cases are also correspondingly included:

Case 1: If the second coding rate does not belong to the coding rate set, the media processing device obtains the first coding rate from the coding rate set. The first coding rate is less than and closest to the second coding rate.

In other words, the media processing device identifies the second coding rate recommended by the first access network device, and if the second coding rate is not in the coding rate set of the terminal device, selects, as the second coding rate, a coding rate closest to and no more than the second coding rate in the coding rate set of the terminal device. For example, if the second coding rate is 10 and the coding rate set of the terminal device is the AMR-NB coding rate set {4.75 kbps, 5.15 kbps, 5.90 kbps, 6.70 kbps, 7.4 kbps, 7.95 kbps, 10.20 kbps, 12.20 kbps}, the second coding rate is not in the coding rate set of the terminal device. The media processing device may select 7.95 kbps from the coding rate set of the terminal device as the first coding rate based on the signal strength change rate and the second coding rate. In other words, the first coding rate is 7.95 kbps.

Case 2: If the second coding rate belongs to the coding rate set, the media processing device determines that the first coding rate is equal to the second coding rate.

In other words, the media processing device identifies the second coding rate recommended by the first access network device, and if the second coding rate is in the coding rate set of the terminal device, determines the first coding rate as the second coding rate. For example, if the second coding rate is 10.20 kbps and the coding rate set of the terminal device is the AMR-NB coding rate set {4.75 kbps, 5.15 kbps, 5.90 kbps, 6.70 kbps, 7.4 kbps, 7.95 kbps, 10.20 kbps, 12.20 kbps}, the second coding rate is in the coding rate set of the terminal device. The media processing device may determine that the first coding rate is 10.20 kbps.

After determining the first coding rate, the media processing device may send the first coding rate to the terminal device, that is, perform S408. Correspondingly, the terminal device receives the first coding rate. The terminal device receives the first coding rate from the media processing device, and may code the audio and video data based on the first coding rate, and send a media stream packaged at the first coding rate.

This embodiment of this disclosure provides a coding rate adjustment method. The terminal device may determine the signal strength change rate of the wireless network, and send the signal strength change rate to the first access network device. The first access network device may determine the second coding rate based on the signal strength change rate, and send the second coding rate to the media processing device. The media processing device receives the second coding rate from the first access network device, and determines the first coding rate based on the coding rate information of the terminal device and the second coding rate. The terminal device codes the audio and video data based on the first coding rate. It can be learned that, according to the method, the first coding rate can be determined based on the signal strength change rate of the wireless network, such that when the terminal device is in the weak coverage area or the area with high network load, the terminal device codes the audio and video data based on the first coding rate, to help reduce a packet loss rate, and reduce a probability of interrupting communication of the terminal device.

Figure 5A:
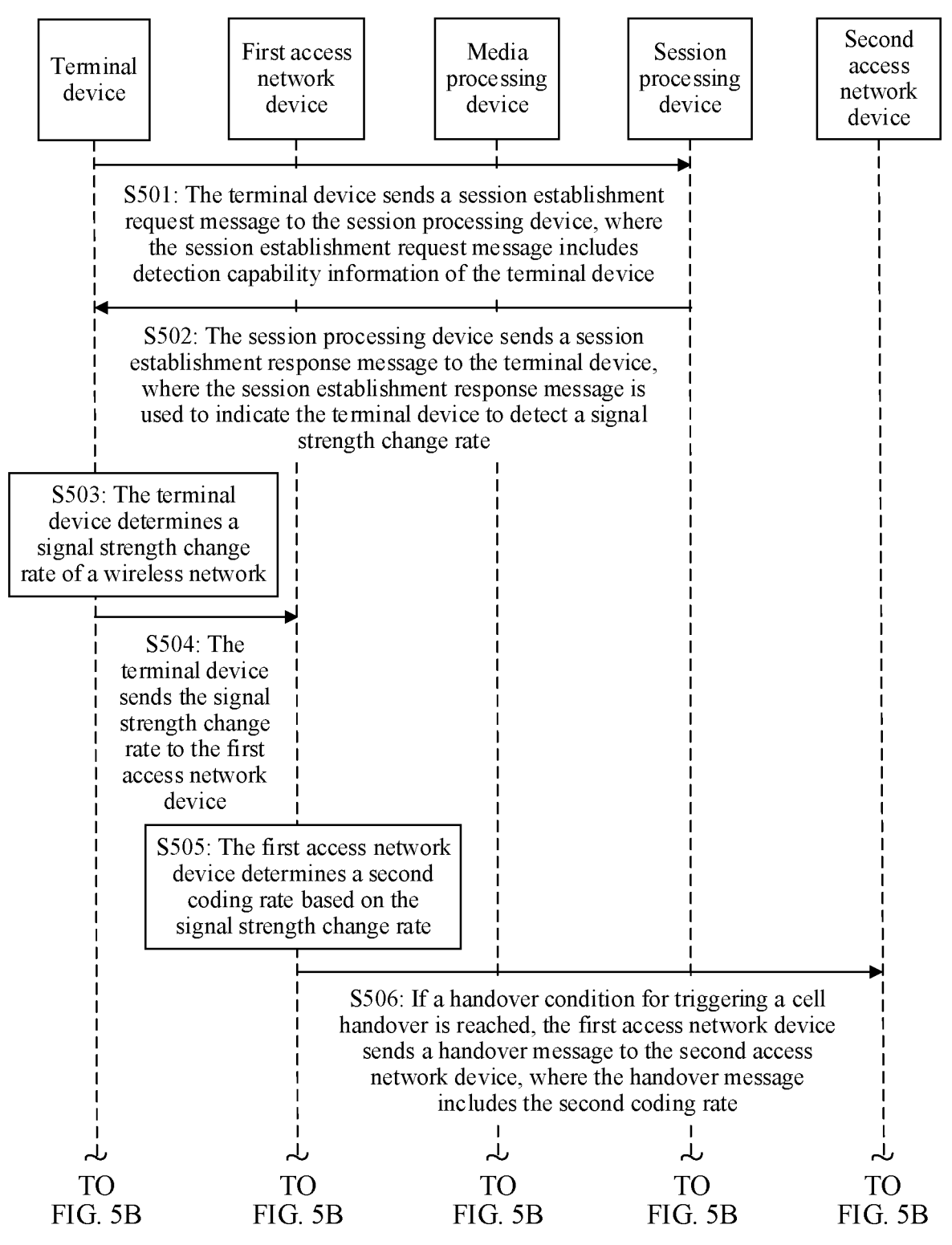
FIG. 5A and FIG. 5B are a schematic flowchart of another coding rate adjustment method according to an embodiment of this disclosure.
Figure 5B:
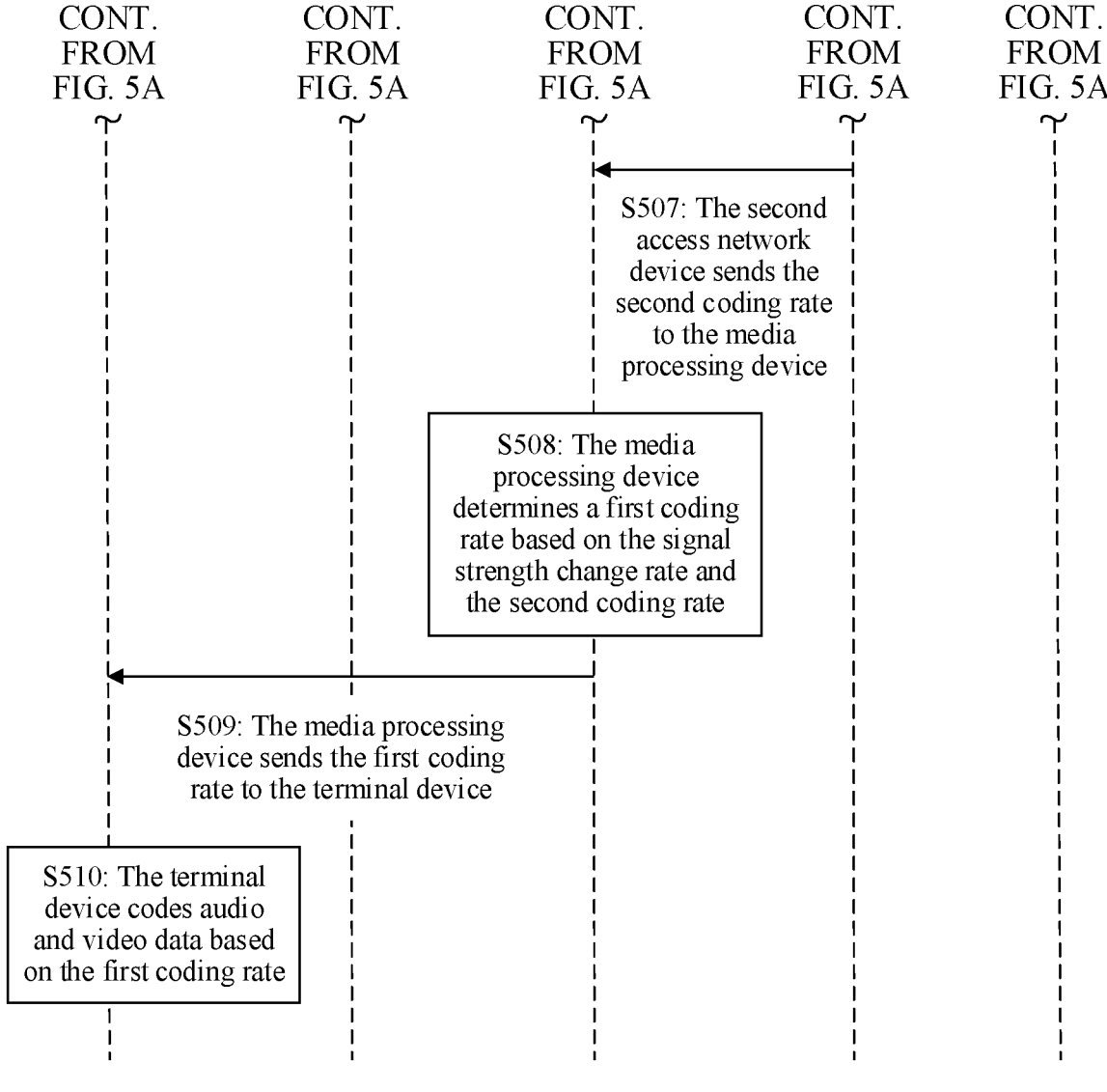

FIG. 5A and FIG. 5B show another coding rate adjustment method according to an embodiment of this disclosure. The method may be implemented through interaction between a terminal device, a network device, and an access network device. In this embodiment of this disclosure, the access network device includes a first access network device and a second access network device, and the network device includes a media processing device and a session processing device in a core network. In the coding rate adjustment method in this embodiment of this disclosure, adjusting a coding rate and triggering a network handover based on a signal strength change rate is mainly described. The method may include the following steps.

S501: The terminal device sends a session establishment request message to the session processing device, where the session establishment request message includes detection capability information of the terminal device. Correspondingly, the session processing device receives the session establishment request message.

S502: The session processing device sends a session establishment response message to the terminal device, where the session establishment response message is used to indicate the terminal device to detect a signal strength change rate. Correspondingly, the terminal device receives the session establishment response message from the session processing device.

S503: The terminal device determines a signal strength change rate of a wireless network.

S504: The terminal device sends the signal strength change rate to the first access network device. Correspondingly, the first access network device receives the signal strength change rate.

S505: The first access network device determines a second coding rate based on the signal strength change rate.

S506: If a handover condition for triggering a cell handover is reached, the first access network device sends a handover message to the second access network device, where the handover message includes the second coding rate. Correspondingly, the second access network device receives the handover message from the first access network device.

S507: The second access network device sends the second coding rate to the media processing device. Correspondingly, the media processing device receives the second coding rate.

S508: The media processing device determines a first coding rate based on the signal strength change rate and the second coding rate.

S509: The media processing device sends the first coding rate to the terminal device. Correspondingly, the terminal device receives the first coding rate.

S510: The terminal device codes audio and video data based on the first coding rate.

In this embodiment, it is assumed that related parameters such as a signal strength change rate and signal strength of a current network indicate that the handover condition for triggering the cell handover is reached, different from the embodiment shown in FIG. 4, a handover procedure is further added in this embodiment. For related steps and optional steps in S501 to S505 in this embodiment, refer to the related description in the embodiment shown in FIG. 4. Details are not described herein again. The following describes the handover procedure in detail.

When a mobile terminal moves within a system, if signal strength decreases very quickly, and the terminal device cannot maintain continuous communication even if the terminal device adjusts the coding rate, the terminal device needs to trigger an event report based on the signal measurement result, to be handed over from the first access network device with poor signal quality to the second access network device with better signal quality. The first access network device represents a source access network device (for example, a source base station), and the second access network device represents a target access network device (for example, a target base station).

The handover condition for triggering the cell handover may include one or more of the following: Quality of a serving cell is higher than a preset first threshold, the quality of the serving cell is lower than a preset second threshold, a difference between quality of an intra/inter-frequency neighboring cell and the quality of the serving cell is higher than a preset third threshold, the quality of the inter-frequency neighboring cell is higher than a preset fourth threshold, and the like. For example, if signal strength of a serving cell in which the terminal device is located is lower than a preset signal strength threshold, the cell handover is triggered. The first access network device sends the handover message to the second access network device, and the handover message includes the second coding rate. In other words, when the first access network device triggers the handover, the first access network device determines the second coding rate. Then, the first access network device initiates a handover request to the second access network device, and the handover request carries the second coding rate. In other words, S506 is performed.

The second access network device receives the second coding rate from the first access network device, and may send the second coding rate to the media processing device. In other words, S507 is performed. The second coding rate sent by the second access network device to the media processing device may also be carried in the handover message.

For related steps and optional steps in S508 to S510 in this embodiment, refer to the related description in the embodiment shown in FIG. 4. Details are not described herein again.

This embodiment of this disclosure provides a coding rate adjustment method. The terminal device may determine the signal strength change rate of the wireless network, and send the signal strength change rate to the first access network device. The first access network device may determine the second coding rate based on the signal strength change rate. If the handover condition for triggering the cell handover is reached, the first access network device sends the handover message to the second access network device, and the handover message includes the second coding rate. The second access network device sends the second coding rate to the media processing device. The media processing device receives the second coding rate from the first access network device, and determines the first coding rate based on the coding rate information of the terminal device and the second coding rate. The terminal device codes the audio and video data based on the first coding rate. It can be learned that according to the method, the first coding rate can be determined based on the signal strength change rate of the wireless network, such that the terminal device can code the audio and video data based on the first coding rate, and can be handed over to a target base station with better signal strength, to help reduce a packet loss rate, and reduce a probability of interrupting communication of the terminal device.

Figure 6A:
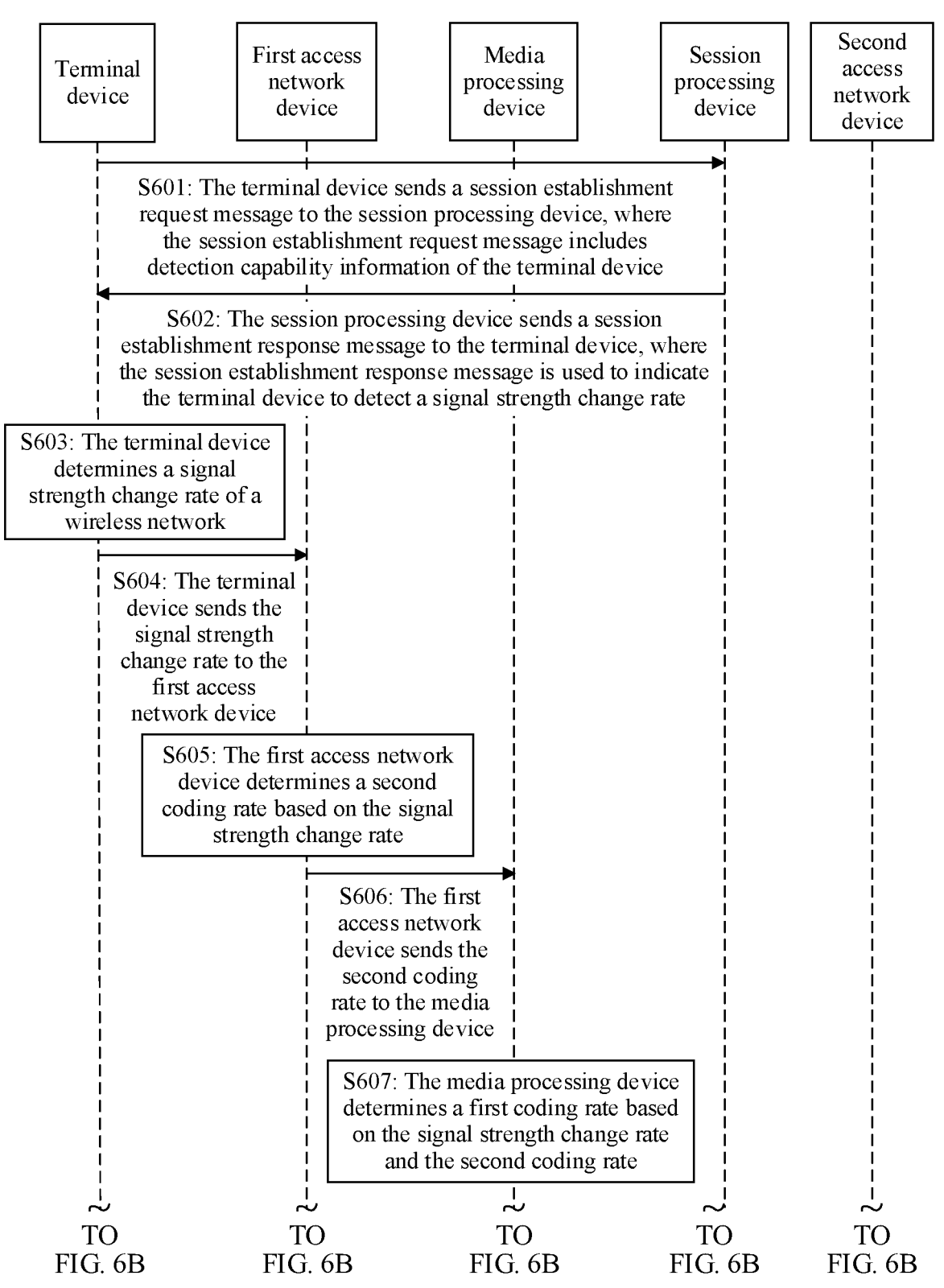
FIG. 6A and FIG. 6B are a schematic flowchart of another coding rate adjustment method according to an embodiment of this disclosure.
Figure 6B:
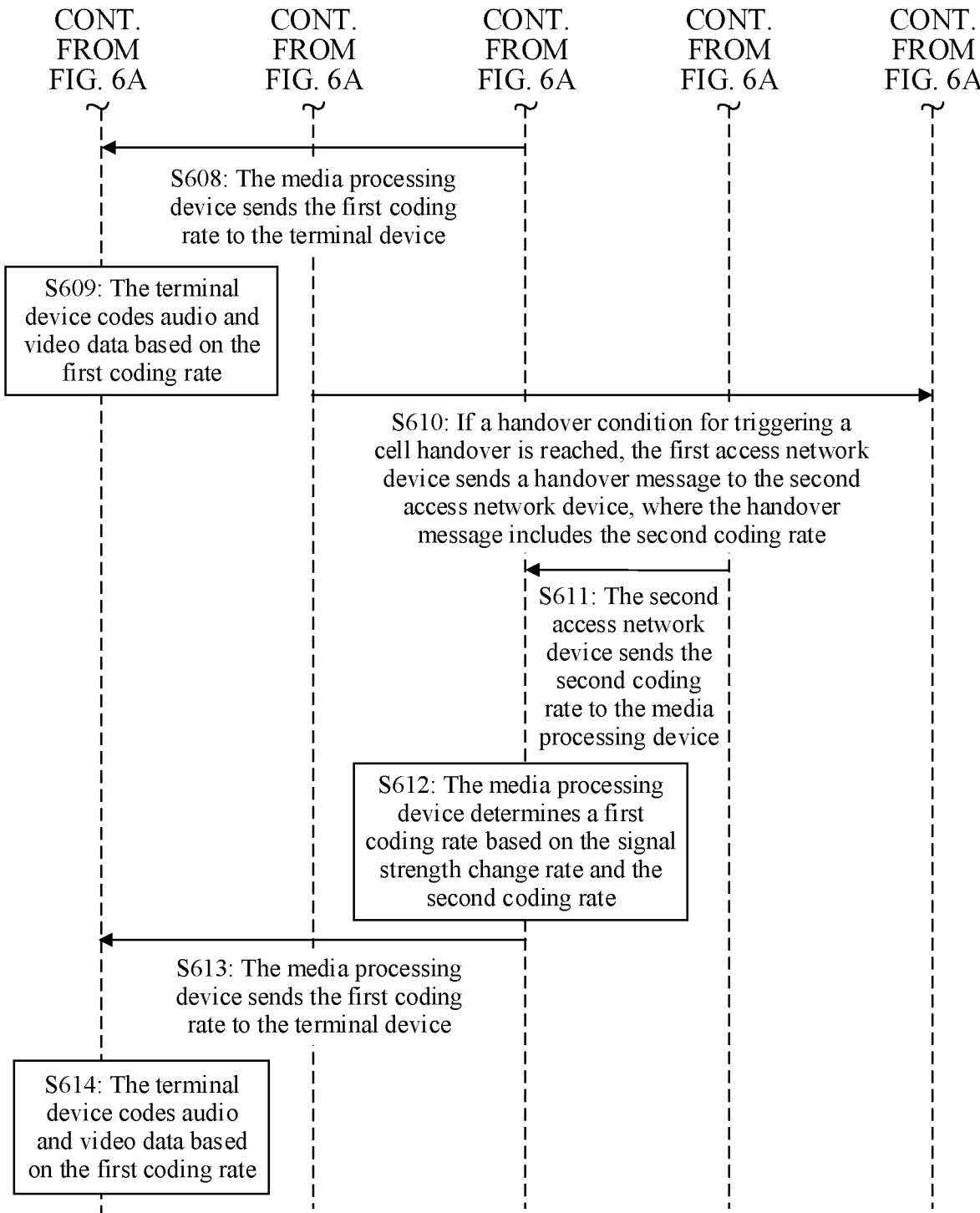

FIG. 6A and FIG. 6B show another coding rate adjustment method according to an embodiment of this disclosure. The method may be implemented through interaction between a terminal device, a network device, and an access network device. In this embodiment of this disclosure, the access network device includes a first access network device and a second access network device, and the network device includes a media processing device and a session processing device in a core network. In the coding rate adjustment method described in this embodiment of this disclosure, the following content is mainly described: The coding rate is adjusted based on the signal strength change rate, and the coding rate is adjusted and a network handover is triggered based on a signal strength change rate and a measurement result continuously reported by the terminal device. The method may include the following steps.

S601: The terminal device sends a session establishment request message to the session processing device, where the session establishment request message includes detection capability information of the terminal device. Correspondingly, the session processing device receives the session establishment request message.

S602: The session processing device sends a session establishment response message to the terminal device, where the session establishment response message is used to indicate the terminal device to detect a signal strength change rate. Correspondingly, the terminal device receives the session establishment response message from the session processing device.

S603: The terminal device determines a signal strength change rate of a wireless network.

S604: The terminal device sends the signal strength change rate to the first access network device. Correspondingly, the first access network device receives the signal strength change rate.

S605: The first access network device determines a second coding rate based on the signal strength change rate.

S606: The first access network device sends the second coding rate to the media processing device. Correspondingly, the media processing device receives the second coding rate.

S607: The media processing device determines a first coding rate based on the signal strength change rate and the second coding rate.

S608: The media processing device sends the first coding rate to the terminal device. Correspondingly, the terminal device receives the first coding rate.

S609: The terminal device codes audio and video data based on the first coding rate.

S610: If a handover condition for triggering a cell handover is reached, the first access network device sends a handover message to the second access network device, where the handover message includes the second coding rate. Correspondingly, the second access network device receives the handover message from the first access network device.

S611: The second access network device sends the second coding rate to the media processing device. Correspondingly, the media processing device receives the second coding rate.

S612: The media processing device determines a first coding rate based on the signal strength change rate and the second coding rate.

S613: The media processing device sends the first coding rate to the terminal device. Correspondingly, the terminal device receives the first coding rate.

S614: The terminal device codes audio and video data based on the first coding rate.

Because the terminal device continuously detects signal strength and the signal strength change rate of the wireless network, if the terminal device currently enters a weak coverage area or an area with high network load and enters the weak coverage area or the area with high network load again after a period of time, the terminal device may adjust the coding rate and/or perform the cell handover for a plurality of times.

In this embodiment, it is assumed that the media processing device determines the corresponding first coding rate based on the signal strength change rate measured by the terminal device, and the terminal device adjusts, based on the first coding rate, the coding rate for coding the audio and video data. The terminal device may adjust the coding rate and/or perform the cell handover again when related parameters such as the signal strength change rate and the signal strength of the wireless network indicate that the handover condition for triggering the cell handover is reached. In other words, this embodiment can be understood as a combination of the embodiments shown in FIG. 4 and FIG. 5A and FIG. 5B. For related steps and optional steps in S601 to S614 in this embodiment, refer to the related description in the embodiment shown in FIG. 4 and FIG. 5A and FIG. 5B. Details are not described herein again.

Optionally, the combination of the embodiments shown in FIG. 4 and FIG. 5A and FIG. 5B may be that the terminal device adjusts the coding rate and performs cell handover, and the terminal device adjusts the coding rate again after a period of time. This is not limited in this embodiment.

This embodiment of this disclosure provides a coding rate adjustment method. The terminal device may determine the signal strength change rate of the wireless network, and send the signal strength change rate to the first access network device. The first access network device may determine the second coding rate based on the signal strength change rate, and send the second coding rate to the media processing device. The media processing device receives the second coding rate from the first access network device, and determines the first coding rate based on the coding rate information of the terminal device and the second coding rate. The terminal device codes the audio and video data based on the first coding rate.

If the handover condition for triggering the cell handover is reached, the first access network device sends the handover message to the second access network device, and the handover message includes the second coding rate. The second access network device sends the second coding rate to the media processing device. The media processing device receives the second coding rate from the first access network device, and determines the first coding rate based on the coding rate information of the terminal device and the second coding rate. The terminal device codes the audio and video data based on the first coding rate. It can be learned that according to the method, the first coding rate can be determined based on the signal strength change rate of the wireless network, such that the terminal device can code the audio and video data based on the first coding rate, and can adjust the coding rate again and/or be handed over to a target base station with better signal strength based on a measurement result of the terminal device, to help reduce a packet loss rate, and reduce a probability of interrupting communication of the terminal device.

Figure 12:
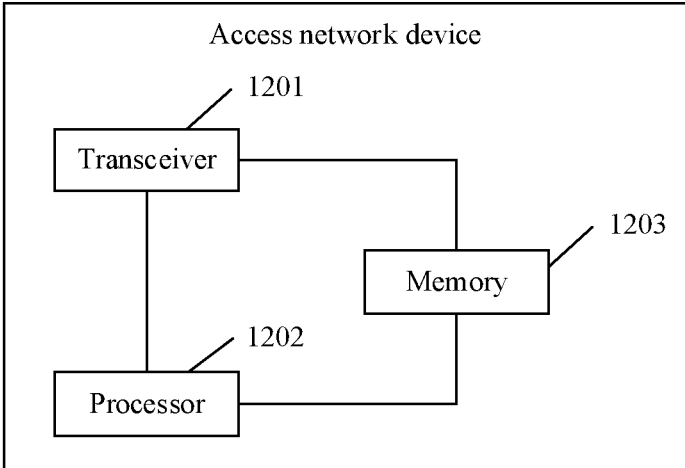
FIG. 12 is a schematic diagram of a structure of another access network device according to an embodiment of this disclosure.

A related device in an embodiment of this disclosure is described in detail below with reference to FIG. 7 and FIG. 12.

An embodiment of this disclosure provides a terminal device. As shown in FIG. 7, a terminal device 700 may be used to implement a coding rate adjustment method in embodiments of this disclosure. The terminal device 700 may include: a processing unit 701, configured to determine a signal strength change rate of a wireless network; and a transceiver unit 702, configured to send the signal strength change rate to a first access network device.

The transceiver unit 702 is further configured to receive a first coding rate from a media processing device. The first coding rate is determined based on the signal strength change rate.

The processing unit 701 is further configured to code audio and video data based on the first coding rate.

For an implementation, refer to the detailed description of the steps performed by the terminal device in the embodiments shown in FIG. 4 to FIG. 6A and FIG. 6B. Details are not described herein again.

In an implementation, the transceiver unit 702 is further configured to: send a session establishment request message to a session processing device, where the session establishment request message includes detection capability information of the terminal device 700, and the detection capability information is used to indicate that the terminal device 700 has a capability of detecting the signal strength change rate; and receive a session establishment response message from the session processing device, where the session establishment response message is used to indicate the terminal device 700 to detect the signal strength change rate.

The processing unit 701 is further configured to start to detect the signal strength change rate based on the session establishment response message.

For an implementation, refer to the detailed description of the steps performed by the terminal device in the embodiments shown in FIG. 4 to FIG. 6A and FIG. 6B. Details are not described herein again.

In an implementation, if a handover condition for triggering a cell handover is reached, the transceiver unit 702 is further configured to receive a handover message from the first access network device. The handover message includes a second coding rate. The second coding rate is determined based on the signal strength change rate, and the cell handover means that the terminal device 700 is handed over from the first access network device to a second access network device.

For an implementation, refer to the detailed description of the steps performed by the terminal device in the embodiments shown in FIG. 4 to FIG. 6A and FIG. 6B. Details are not described herein again.

In an implementation, the transceiver unit 702 is further configured to receive a measurement control request message from the first access network device. The measurement control request message includes indication information used to indicate the terminal device 700 to obtain signal strength, and a sampling periodicity of the signal strength.

When the processing unit 701 is configured to determine the signal strength change rate of the wireless network, the processing unit 701 is configured to: determine the signal strength change rate based on the signal strength and the sampling periodicity of the signal strength.

For an implementation, refer to the detailed description of the steps performed by the terminal device in the embodiments shown in FIG. 4 to FIG. 6A and FIG. 6B. Details are not described herein again.

Figure 7:
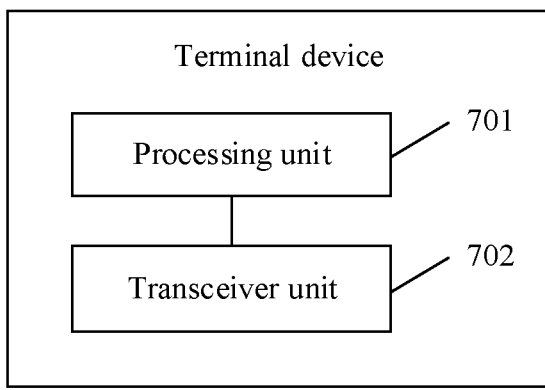
FIG. 7 is a schematic diagram of a structure of a terminal device according to an embodiment of this disclosure.
Figure 8:
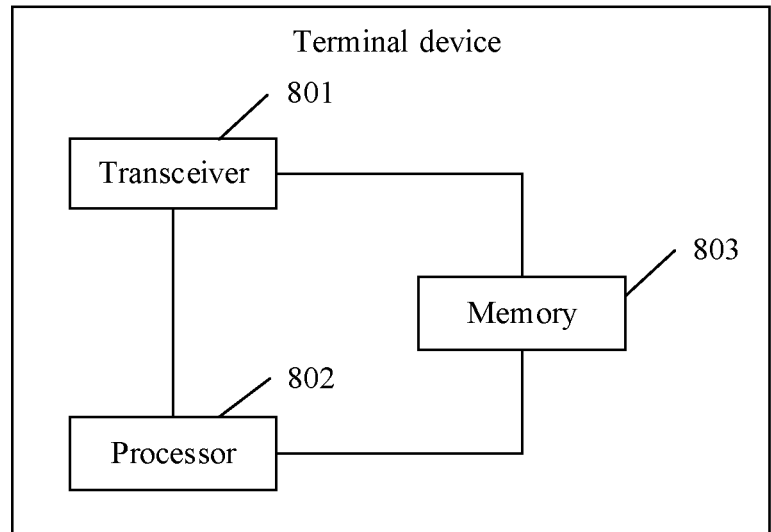
FIG. 8 is a schematic diagram of a structure of another terminal device according to an embodiment of this disclosure.

In an implementation, related functions implemented by the various units in FIG. 7 may be implemented using a transceiver and a processor. FIG. 8 is a schematic diagram of a structure of a terminal device 800 according to an embodiment of this disclosure. The terminal device 800 may be a device (for example, a chip) having a coding rate adjustment function described in embodiments of this disclosure. The terminal device 800 may include a transceiver 801, at least one processor 802, and a memory 803. The transceiver 801, the processor 802, and the memory 803 may be connected to each other through one or more communication buses, or may be connected to each other in another manner. This embodiment is described using an example in which the transceiver 801, the processor 802, and the memory 803 are connected to each other through the communication bus.

The transceiver 801 may be configured to: send information, and receive information. It can be understood that the transceiver 801 is a generic term, and may include a receiver and a transmitter. For example, the receiver is configured to receive a first coding rate from a media processing device.

The processor 802 may be configured to: process data of the terminal device, or process the information received by the transceiver 801. The processor 802 may include one or more processors. For example, the processor 802 may be one or more central processing units (CPUs), a network processor (NP), a hardware chip, or any combination thereof. When the processor 802 is one CPU, the CPU may be a single-core CPU or a multi-core CPU.

The memory 803 is configured to store program code, or the like. The memory 803 may include a volatile memory, for example, a random-access memory (RAM). The memory 803 may further include a non-volatile memory, for example, a read-only memory (ROM), a flash memory, a hard disk drive (HDD), or a solid state disk or solid-state drive (SSD). The memory 803 may further include a combination of the foregoing types of memories.

The transceiver 801 and the processor 802 may be configured to implement the coding rate adjustment method in embodiments of this disclosure. An implementation is as follows.

The processor 802 is configured to determine a signal strength change rate of a wireless network.

The transceiver 801 is configured to send the signal strength change rate to a first access network device.

The transceiver 801 is further configured to receive a first coding rate from a media processing device. The first coding rate is determined based on the signal strength change rate.

The processor 802 is further configured to code audio and video data based on the first coding rate.

For an implementation, refer to the detailed description of the steps performed by the terminal device in the embodiments shown in FIG. 4 to FIG. 6A and FIG. 6B. Details are not described herein again.

In an implementation, the transceiver 801 is further configured to: send a session establishment request message to a session processing device, where the session establishment request message includes detection capability information of the terminal device 800, and the detection capability information is used to indicate that the terminal device 800 has a capability of detecting the signal strength change rate; and receive a session establishment response message from the session processing device, where the session establishment response message is used to indicate the terminal device 800 to detect the signal strength change rate.

The processor 802 is further configured to start to detect the signal strength change rate based on the session establishment response message.

For an implementation, refer to the detailed description of the steps performed by the terminal device in the embodiments shown in FIG. 4 to FIG. 6A and FIG. 6B. Details are not described herein again.

In an implementation, if a handover condition for triggering a cell handover is reached, the transceiver 801 is further configured to receive a handover message from the first access network device. The handover message includes a second coding rate. The second coding rate is determined based on the signal strength change rate, and the cell handover means that the terminal device 800 is handed over from the first access network device to a second access network device.

For an implementation, refer to the detailed description of the steps performed by the terminal device in the embodiments shown in FIG. 4 to FIG. 6A and FIG. 6B. Details are not described herein again.

In an implementation, the transceiver 801 is further configured to receive a measurement control request message from the first access network device. The measurement control request message includes indication information used to indicate the terminal device 800 to obtain signal strength, and a sampling periodicity of the signal strength.

When the processor 802 is configured to determine the signal strength change rate of the wireless network, the processor 802 is configured to: determine the signal strength change rate based on the signal strength and the sampling periodicity of the signal strength.

For an implementation, refer to the detailed description of the steps performed by the terminal device in the embodiments shown in FIG. 4 to FIG. 6A and FIG. 6B. Details are not described herein again.

Figure 9:
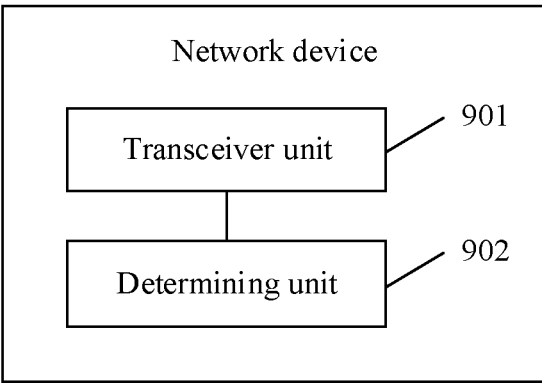
FIG. 9 is a schematic diagram of a structure of a network device according to an embodiment of this disclosure.

An embodiment of this disclosure provides a network device. As shown in FIG. 9, a network device 900 may be used to implement the coding rate adjustment method in embodiments of this disclosure. The network device 900 may include: a transceiver unit 901, configured to receive a first notification message from a session processing device, where the first notification message includes detection capability information of a terminal device, and the detection capability information is used to indicate that the terminal device has a capability of detecting a signal strength change rate.

The transceiver unit 901 is further configured to receive a second coding rate from a first access network device. The second coding rate is determined based on the signal strength change rate.

A determining unit 902 is configured to determine, based on coding rate information and the second coding rate, a first coding rate at which the terminal device codes audio and video data.

The transceiver unit 901 is further configured to send the first coding rate to the terminal device.

For an implementation, refer to the detailed description of the steps performed by the media processing device in the embodiments shown in FIG. 4 to FIG. 6A and FIG. 6B. Details are not described herein again.

In an implementation, the first notification message further includes the coding rate information, and the coding rate information includes a coding rate set of the terminal device. If the second coding rate does not belong to the coding rate set, the determining unit 902 is further configured to obtain the first coding rate from the coding rate set. The first coding rate is less than and closest to the second coding rate.

For an implementation, refer to the detailed description of the steps performed by the media processing device in the embodiments shown in FIG. 4 to FIG. 6A and FIG. 6B. Details are not described herein again.

In an implementation, the transceiver unit 901 is further configured to send the coding rate information to the first access network device. The coding rate information includes the coding rate set of the terminal device. If the second coding rate belongs to the coding rate set, the determining unit 902 is further configured to determine that the first coding rate is equal to the second coding rate.

For an implementation, refer to the detailed description of the steps performed by the media processing device in the embodiments shown in FIG. 4 to FIG. 6A and FIG. 6B. Details are not described herein again.

Figure 10:
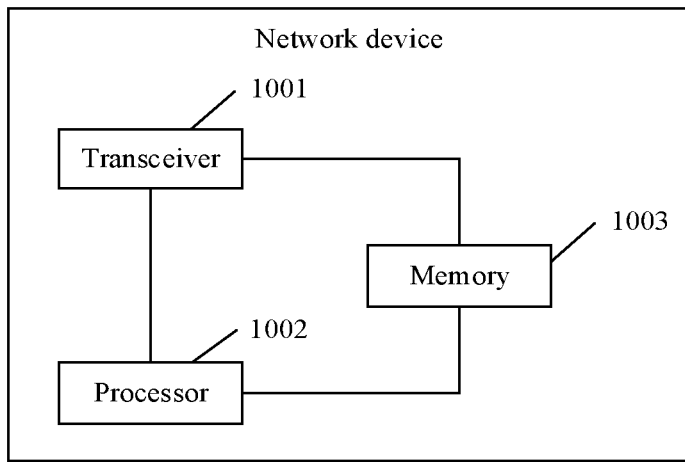
FIG. 10 is a schematic diagram of a structure of another network device according to an embodiment of this disclosure.

In an implementation, related functions implemented by the various units in FIG. 9 may be implemented using a transceiver and a processor. FIG. 10 is a schematic diagram of a structure of a network device 1000 according to an embodiment of this disclosure. The network device 1000 may be a device (for example, a chip) having a coding rate adjustment function described in embodiments of this disclosure. The network device 1000 may include a transceiver 1001, at least one processor 1002, and a memory 1003. The transceiver 1001, the processor 1002, and the memory 1003 may be connected to each other through one or more communication buses, or may be connected to each other in another manner. This embodiment is described using an example in which the transceiver 1001, the processor 1002, and the memory 1003 are connected to each other through the communication bus.

The transceiver 1001 may be configured to: send information, and receive information. It can be understood that the transceiver 1001 is a generic term, and may include a receiver and a transmitter.

The processor 1002 may be configured to: process data of the network device, or process the information received by the transceiver 1001. The processor 1002 may include one or more processors. For example, the processor 1002 may be one or more CPUs, an NP, a hardware chip, or any combination thereof. When the processor 1002 is one CPU, the CPU may be a single-core CPU or a multi-core CPU.

The memory 1003 is configured to store program code, or the like. The memory 1003 may include a volatile memory, for example, a RAM. The memory 1003 may further include a nonvolatile memory, for example, a ROM, a flash memory, an HDD, or an SSD. The memory 1003 may further include a combination of the foregoing types of memories.

The transceiver 1001 and the processor 1002 may be configured to implement the coding rate adjustment method in embodiments of this disclosure. An implementation is as follows.

The transceiver 1001 is configured to receive a first notification message from a session processing device. The first notification message includes detection capability information of a terminal device, and the detection capability information is used to indicate that the terminal device has a capability of detecting a signal strength change rate.

The transceiver 1001 is further configured to receive a second coding rate from a first access network device. The second coding rate is determined based on the signal strength change rate.

The processor 1002 is configured to determine, based on coding rate information and the second coding rate, a first coding rate at which the terminal device codes audio and video data.

The transceiver 1001 is further configured to send the first coding rate to the terminal device.

For an implementation, refer to the detailed description of the steps performed by the media processing device in the embodiments shown in FIG. 4 to FIG. 6A and FIG. 6B. Details are not described herein again.

In an implementation, the first notification message further includes the coding rate information, and the coding rate information includes a coding rate set of the terminal device. If the second coding rate does not belong to the coding rate set, the processor 1002 is further configured to obtain the first coding rate from the coding rate set. The first coding rate is less than and closest to the second coding rate.

For an implementation, refer to the detailed description of the steps performed by the media processing device in the embodiments shown in FIG. 4 to FIG. 6A and FIG. 6B. Details are not described herein again.

In an implementation, the transceiver 1001 is further configured to send the coding rate information to the first access network device. The coding rate information includes the coding rate set of the terminal device. If the second coding rate belongs to the coding rate set, the processor 1002 is further configured to determine that the first coding rate is equal to the second coding rate.

For an implementation, refer to the detailed description of the steps performed by the media processing device in the embodiments shown in FIG. 4 to FIG. 6A and FIG. 6B. Details are not described herein again.

Figure 11:
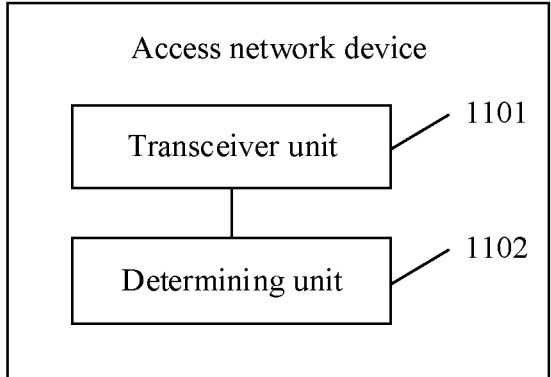
FIG. 11 is a schematic diagram of a structure of an access network device according to an embodiment of this disclosure.

An embodiment of this disclosure provides an access network device. As shown in FIG. 11, the access network device 1100 may be used to implement the coding rate adjustment method in embodiments of this disclosure. The access network device 1100 may include: a transceiver unit 1101, configured to receive a signal strength change rate of a wireless network from a terminal device; and a determining unit 1102, configured to determine a second coding rate based on the signal strength change rate of the wireless network.

The transceiver unit 1101 is further configured to send the second coding rate to a media processing device.

For an implementation, refer to the detailed description of the steps performed by a first access network device or a second access network device in the embodiments shown in FIG. 4 to FIG. 6A and FIG. 6B. Details are not described herein again.

In an implementation, the transceiver unit 1101 is further configured to receive a second notification message from the media processing device. The second notification message includes detection capability information of the terminal device, and the detection capability information is used to indicate that the terminal device has a capability of detecting the signal strength change rate. The transceiver unit 1101 is further configured to send a measurement control request message to the terminal device. The measurement control request message is used to indicate the terminal device to measure the signal strength change rate.

For an implementation, refer to the detailed description of the steps performed by a first access network device in the embodiments shown in FIG. 4 to FIG. 6A and FIG. 6B. Details are not described herein again.

In an implementation, the second notification message further includes coding rate information of the terminal device, and the coding rate information includes a coding rate set of the terminal device. The determining unit 1102 is further configured to determine, as the second coding rate from the coding rate set, a coding rate corresponding to the signal strength change rate.

For an implementation, refer to the detailed description of the steps performed by a first access network device in the embodiments shown in FIG. 4 to FIG. 6A and FIG. 6B. Details are not described herein again.

In an implementation, if a handover condition for triggering a cell handover is reached, the transceiver unit 1101 is further configured to send a handover message to a second access network device. The handover message includes the second coding rate. The cell handover is that the terminal device is handed over from the first access network device to the second access network device.

For an implementation, refer to the detailed description of the steps performed by a first access network device in the embodiments shown in FIG. 4 to FIG. 6A and FIG. 6B. Details are not described herein again.

In an implementation, related functions implemented by the various units in FIG. 11 may be implemented using a transceiver and a processor. FIG. 12 is a schematic diagram of a structure of an access network device according to an embodiment of this disclosure. The access network device may be a device (for example, a chip) having a coding rate adjustment function described in embodiments of this disclosure. An access network device 1200 may include a transceiver 1201, at least one processor 1202, and a memory 1203. The transceiver 1201, the processor 1202, and the memory 1203 may be connected to each other through one or more communication buses, or may be connected to each other in another manner. This embodiment is described using an example in which the transceiver 1201, the processor 1202, and the memory 1203 are connected to each other through the communication bus.

The transceiver 1201 may be configured to: send information, and receive information. It can be understood that the transceiver 1201 is a generic term, and may include a receiver and a transmitter.

The processor 1202 may be configured to: process data of the access network device, or process the information received by the transceiver 1201. The processor 1202 may include one or more processors. For example, the processor 1202 may be one or more central processing units CPUs, an NP, a hardware chip, or any combination thereof. When the processor 1202 is one CPU, the CPU may be a single-core CPU or a multi-core CPU.

The memory 1203 is configured to store program code, or the like. The memory 1203 may include a volatile memory, for example, a RAM. The memory 1203 may further include a nonvolatile memory, for example, a ROM, a flash memory, an HDD, or an SSD. The memory 1203 may further include a combination of the foregoing types of memories.

The transceiver 1201 and the processor 1202 may be configured to implement the coding rate adjustment method in embodiments of this disclosure. An implementation is as follows.

The transceiver 1201 is configured to receive a signal strength change rate of a wireless network from a terminal device.

The processor 1202 is configured to determine a second coding rate based on the signal strength change rate of the wireless network.

The transceiver 1201 is further configured to send the second coding rate to a media processing device.

For an implementation, refer to the detailed description of the steps performed by a first access network device or a second access network device in the embodiments shown in FIG. 4 to FIG. 6A and FIG. 6B. Details are not described herein again.

In an implementation, the transceiver 1201 is further configured to receive a second notification message from the media processing device. The second notification message includes detection capability information of the terminal device, and the detection capability information is used to indicate that the terminal device has a capability of detecting the signal strength change rate.

The transceiver 1201 is further configured to send a measurement control request message to the terminal device. The measurement control request message is used to indicate the terminal device to measure the signal strength change rate.

For an implementation, refer to the detailed description of the steps performed by a first access network device in the embodiments shown in FIG. 4 to FIG. 6A and FIG. 6B. Details are not described herein again.

In an implementation, the second notification message further includes coding rate information of the terminal device, and the coding rate information includes a coding rate set of the terminal device. The processor 1202 is further configured to determine, as the second coding rate from the coding rate set, a coding rate corresponding to the signal strength change rate.

For an implementation, refer to the detailed description of the steps performed by a first access network device in the embodiments shown in FIG. 4 to FIG. 6A and FIG. 6B. Details are not described herein again.

In an implementation, if a handover condition for triggering a cell handover is reached, the transceiver 1201 is further configured to send a handover message to a second access network device. The handover message includes the second coding rate. The cell handover is that the terminal device is handed over from the first access network device to the second access network device.

For an implementation, refer to the detailed description of the steps performed by a first access network device in the embodiments shown in FIG. 4 to FIG. 6A and FIG. 6B. Details are not described herein again.

An embodiment of this disclosure provides a communication system. The communication system includes the terminal device, the network device, and the access network device in the foregoing embodiments.

An embodiment of this disclosure provides a computer-readable storage medium. The computer-readable storage medium stores a program or instructions. When the program or instructions are run on a computer, the computer is enabled to perform the coding rate adjustment method in embodiments of this disclosure.

An embodiment of this disclosure provides a chip or a chip system. The chip or the chip system includes at least one processor and an interface, the interface and the at least one processor are interconnected through a line, and the at least one processor is configured to execute a computer program or instructions, to perform the coding rate adjustment method in embodiments of this disclosure.

The interface in the chip may be an input/output interface, a pin, a circuit, or the like.

The chip system in the foregoing aspects may be a system on chip (SOC), a baseband chip, or the like. The baseband chip may include a processor, a channel coder, a digital signal processor, a modem, an interface module, or the like.

In an implementation, the chip or the chip system in this disclosure further includes at least one memory, and the at least one memory stores instructions. The memory may be a storage unit inside the chip, for example, a register or a buffer, or may be a storage unit (for example, a read-only memory or a random access memory) of the chip.

All or a part of the foregoing embodiments may be implemented using software, hardware, firmware, or any combination thereof. When software is used to implement the embodiments, all or a part of the embodiments may be implemented in a form of a computer program product. The computer program product includes one or more computer instructions. When the computer instructions are loaded and executed on a computer, the procedures or functions according to embodiments of this disclosure are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a digital video disc (DVD)), a semiconductor medium (for example, an SSD), or the like.

A person of ordinary skill in the art may be aware that, in combination with the examples described in embodiments disclosed in this specification, units and algorithm steps can be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of this disclosure.

What is claimed is:

1. A coding rate adjustment method, comprising:
receiving, by a terminal device, a measurement control request message from a first access network device, wherein the measurement control request message comprises indication information instructing the terminal device to obtain a signal strength of a wireless network and a sampling periodicity of the signal strength;
determining, by the terminal device, a signal strength change rate of the wireless network based on the signal strength and the sampling periodicity of the signal strength;
sending the signal strength change rate to the first access network device;
receiving, by the terminal device, a first coding rate from a media processing device, wherein the first coding rate is based on the signal strength change rate; and
coding, by the terminal device, audio and video data based on the first coding rate.

2. The coding rate adjustment method according to claim 1, wherein before determining the signal strength change rate, the coding rate adjustment method further comprises sending, by the terminal device, a session establishment request message to a session processing device in the wireless network.

3. The coding rate adjustment method according to claim 2, wherein the session establishment request message comprises detection capability information of the terminal device.

4. The coding rate adjustment method according to claim 3, wherein the detection capability information indicates that the terminal device is capable of detecting the signal strength change rate.

5. The coding rate adjustment method according to claim 4, further comprising:
receiving, by the terminal device, a session establishment response message from the session processing device, wherein the session establishment response message instructs the terminal device to detect the signal strength change rate; and
starting, by the terminal device, to detect the signal strength change rate based on the session establishment response message.

6. The coding rate adjustment method according to claim 1, further comprising receiving, by the terminal device, a handover message from the first access network device when a condition for triggering a cell handover is reached.

7. The coding rate adjustment method according to claim 6, wherein the handover message comprises a second coding rate based on the signal strength change rate.

8. The coding rate adjustment method according to claim 6, wherein the cell handover is complete when the terminal device is handed over from the first access network device to a second access network device.

9. A coding rate adjustment method, comprising:
receiving, by a media processing device, a first notification message from a session processing device, wherein the first notification message comprises detection capability information of a terminal device, and wherein the detection capability information indicates that the terminal device is capable of detecting a signal strength change rate of a wireless network;
receiving, by the media processing device, a second coding rate from a first access network device, wherein the second coding rate is based on the signal strength change rate, wherein the signal strength change rate is based on a signal strength of the wireless network and a sampling periodicity of the signal strength;
determining, by the media processing device based on coding rate information and the second coding rate, a first coding rate at which the terminal device codes audio and video data; and
sending, by the media processing device, the first coding rate to the terminal device.

10. The coding rate adjustment method according to claim 9, wherein the first notification message further comprises the coding rate information, and wherein the coding rate information comprises a coding rate set of the terminal device.

11. The coding rate adjustment method according to claim 10, wherein determining the first coding rate at which the terminal device codes audio and video data comprises obtaining, by the media processing device, the first coding rate from the coding rate set when the second coding rate does not belong to the coding rate set.

12. The coding rate adjustment method according to claim 11, wherein the first coding rate is less than and closest to the second coding rate.

13. The coding rate adjustment method according to claim 9, further comprising sending, by the media processing device, the coding rate information to the first access network device, wherein the coding rate information comprises a coding rate set of the terminal device.

14. The coding rate adjustment method according to claim 13, wherein determining the first coding rate at which the terminal device codes audio and video data comprises determining, by the media processing device, that the first coding rate is equal to the second coding rate when the second coding rate belongs to the coding rate set.

15. A coding rate adjustment method, comprising:
sending, by a first access network device, a measurement control request message to a terminal device, wherein the measurement control request message instructs the terminal device to measure a signal strength change rate of a wireless network based on a signal strength of the wireless network and a sampling periodicity of the signal strength;
receiving, by the first access network device, the signal strength change rate from the terminal device;
determining, by the first access network device, a second coding rate based on the signal strength change rate of the wireless network; and
sending, by the first access network device, the second coding rate to a media processing device.

16. The coding rate adjustment method according to claim 15, wherein before receiving the signal strength change rate, the coding rate adjustment method further comprises receiving, by the first access network device, a second notification message from the media processing device, wherein the second notification message comprises detection capability information of the terminal device, and wherein the detection capability information indicates that the terminal device is capable of detecting the signal strength change rate.

17. The coding rate adjustment method according to claim 16, wherein the second notification message further comprises coding rate information of the terminal device, and wherein the coding rate information comprises a coding rate set of the terminal device.

18. The coding rate adjustment method according to claim 17, wherein determining the second coding rate based on the signal strength change rate comprises determining, by the first access network device, a coding rate that is in the coding rate set and that corresponds to the signal strength change rate as the second coding rate.

19. The coding rate adjustment method according to claim 18, wherein after determining the second coding rate, the coding rate adjustment method further comprises sending, by the first access network device, a handover message to a second access network device when a condition for triggering a cell handover is reached, wherein the handover message comprises the second coding rate, and wherein the cell handover is complete when the terminal device is handed over from the first access network device to the second access network device.

20. A communication apparatus comprising:
  one or more memories configured to store instructions; and one or more processors coupled to the one or more memories and configured to execute the instructions to cause the communication apparatus to:
  receive a measurement control request message from a first access network device, wherein the measurement control request message comprises indication information instructing the communication apparatus to obtain a signal strength of a wireless network and a sampling periodicity of the signal strength;
  determine a signal strength change rate of the wireless network based on the signal strength and the sampling periodicity of the signal strength;
  send the signal strength change rate to the first access network device;
  receive a first coding rate from a media processing device, wherein the first coding rate is based on the signal strength change rate; and
  code audio and video data based on the first coding rate.

21. The communication apparatus according to claim 20, wherein the one or more processors are further configured to execute the instructions to cause the communication apparatus to:
  receive a session establishment response message from a session processing device, wherein the session establishment response message instructs the communication apparatus to detect the signal strength change rate; and
  start to detect the signal strength change rate based on the session establishment response message.

* * * * *